US008297941B2

(12) United States Patent
Suzuki et al.

(10) Patent No.: US 8,297,941 B2
(45) Date of Patent: Oct. 30, 2012

(54) FUEL PUMP

(75) Inventors: Yoshihito Suzuki, Toyokawa (JP); Masayuki Kobayashi, Kasugai (JP); Hiroshi Inoue, Anjo (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 288 days.

(21) Appl. No.: 12/588,831

(22) Filed: Oct. 29, 2009

(65) Prior Publication Data

US 2010/0047086 A1 Feb. 25, 2010

Related U.S. Application Data

(63) Continuation of application No. 12/211,128, filed on Sep. 16, 2008.

(30) Foreign Application Priority Data

Oct. 12, 2007 (JP) ................................ 2007-266854
Mar. 26, 2008 (JP) ................................ 2008-81574

(51) Int. Cl.
*F04B 49/00* (2006.01)
*F16K 31/12* (2006.01)
*F16K 21/04* (2006.01)

(52) U.S. Cl. ...... 417/307; 417/308; 137/490; 137/512.2

(58) Field of Classification Search .................. 123/457; 417/307, 308, 470, 471; 137/511, 512.2, 137/513.3, 490
See application file for complete search history.

(56) References Cited

U.S. PATENT DOCUMENTS 3,479,999 A * 11/1969 Keller et al. ............... 137/512.2
3,742,926 A * 7/1973 Kemp ........................... 123/467
3,896,845 A * 7/1975 Parker ........................ 137/493.3
4,269,572 A * 5/1981 Nozawa et al. ............... 417/299
4,370,102 A * 1/1983 Sasaki et al. .................. 417/296
4,612,766 A * 9/1986 Eder ............................... 60/764
6,058,912 A * 5/2000 Rembold et al. .............. 123/516
6,135,090 A * 10/2000 Kawachi et al. .............. 123/446
6,609,500 B2 * 8/2003 Ricco et al. .................... 123/446
7,267,108 B2 * 9/2007 Barylski et al. ............... 123/457

(Continued)

FOREIGN PATENT DOCUMENTS

JP 2-198395 8/1990
JP 04-012166 1/1992
JP 4-86370 3/1992

OTHER PUBLICATIONS

Official Action dated Jun. 21, 2011, issued in co-pending U.S. Appl. No. 12/211,128 of Suzuki, filed Sep. 16, 2008.

(Continued)

*Primary Examiner* — Charles Freay
*Assistant Examiner* — Alexander Comley
(74) *Attorney, Agent, or Firm* — Nixon & Vanderhye, PC

(57) ABSTRACT

A housing has a compression chamber and a first passage, through which the compression chamber communicates with an accumulation chamber. A discharge valve is provided in the first passage and configured to open to supply fuel from the compression chamber to the accumulation chamber in response to increase in pressure in the compression chamber. A second passage is configured to communicate the accumulation chamber with the compression chamber via the discharge valve. A valve element allows fuel flow from the accumulation chamber to the compression chamber. A biasing unit biases the valve element to seat the valve element on a valve seat of the second passage. The sidewall of the valve element and the inner wall defining the second passage therebetween define a throttle midway through the second passage for restricting fuel flow from the accumulation chamber to the compression chamber.

10 Claims, 14 Drawing Sheets

U.S. PATENT DOCUMENTS

| | | | | |
|---|---|---|---|---|
| 2001/0031207 | A1* | 10/2001 | Maeda et al. | 417/298 |
| 2005/0133089 | A1 | 6/2005 | Takahashi et al. | |
| 2006/0000448 | A1* | 1/2006 | Ricco et al. | 123/447 |
| 2006/0124110 | A1 | 6/2006 | Schoeffler | |
| 2006/0222538 | A1* | 10/2006 | Inoue et al. | 417/470 |
| 2009/0097997 | A1 | 4/2009 | Suzuki et al. | |
| 2010/0167157 | A1 | 7/2010 | Takahashi et al. | |

OTHER PUBLICATIONS

U.S. Appl. No. 12/211,128, Suzuki et al, filed Sep. 16, 2008.

Japanese Office Action dated Aug. 25, 2009, issued in corresponding Japanese Application No. 2008081574, with English translation.

Final Official Action dated Nov. 15, 2011, issued in copending U.S. Appl. No. 12/211,128 of Suzuki, filed Sep. 16, 2008.

* cited by examiner

FUEL PUMP

CROSS REFERENCE TO RELATED APPLICATIONS

This application is a Continuation of application Ser. No. 12/211,128, filed Sep. 16, 2008, the entire contents of which are hereby incorporated by reference into this application. This application is also based on and claims priority from Japanese Patent Applications No. 2007-266854 filed on Oct. 12, 2007 and No. 2008-81574 filed on Mar. 26, 2008.

FIELD OF THE INVENTION

The present invention relates to a fuel pump for supplying fuel to an internal combustion engine.

BACKGROUND OF THE INVENTION

For example, US 2006/0222538 A1 (JP-A-2006-307829)) discloses a high-pressure fuel pump, which has a passage for returning fuel from an accumulation chamber into a compression chamber of the high-pressure fuel pump by bypassing a discharge valve when the high-pressure fuel pump is being stopped.

In the high-pressure fuel pump of US 2006/0222538 A1, the high-pressure fuel pump includes a functional component such as a discharge valve and has a mounting hole, which is provided in a housing for mounting the functional component. In the present structure, the functional component and the mounting hole therebetween define a clearance as a passage, through which fuel is returned from the accumulation chamber into the compression chamber. In the present structure, when the high-pressure fuel pump is being stopped, fuel at high pressure in the accumulation chamber is returned into the compression chamber so as to reduce fuel pressure in the accumulation chamber. Whereby, the fuel, which is discharged during pump operation, is restricted from returning into the compression chamber through the passage, and thus the volume efficiency of the pump is maintained.

For example, JP-A-4-86370 discloses a high-pressure fuel pump including a discharge valve having a valve element, which has a passage communicating the upstream of the valve element with the downstream of the valve element. The passage accommodates another valve element, which allows only flow of fuel from the downstream to the upstream, and a biasing unit that biases the other valve element in a valve closing direction. In the present structure, fuel pressure at the downstream side with respect to the discharge valve is maintained at a predetermined pressure after the high-pressure fuel pump is stopped.

In the high-pressure fuel pump disclosed in US 2006/0222538 A1, the passage is formed by the clearance between the components, and the passage is configured to restrict the flow rate of fuel passing therethrough. However, in the structure of US 2006/0222538 A1, the passage is regularly opened. Accordingly, fuel pressure in the accumulation chamber decreases to comparatively low pressure in the compression chamber, after the pump is stopped.

The inventor conceived to combine the valve element and the biasing unit disclosed in JP-A-4-86370 with the passage disclosed in US 2006/0222538 A1 so as to maintain the predetermined fuel pressure without decreasing fuel pressure in the accumulation chamber to fuel pressure in the compression chamber. However, the structure may be complicated by simply providing the valve element and the biasing unit disclosed in JP-A-4-86370 in the passage disclosed in US 2006/0222538 A1.

SUMMARY OF THE INVENTION

The present invention addresses the above disadvantage.

According to one aspect of the present invention, a fuel pump for pressurizing fuel and pumping the fuel to an accumulation chamber, the fuel pump comprises a housing having a compression chamber and a first passage, the first passage being configured to communicate the compression chamber with the accumulation chamber. The fuel pump further comprises a plunger axially movable in the pump housing for pressurizing fuel in the compression chamber. The fuel pump further comprises a discharge valve provided in the first passage and configured to open to supply fuel from the compression chamber to the accumulation chamber in response to increase in pressure in the compression chamber. The fuel pump further comprises a second passage configured to communicate one passage portion, which is at a side of the accumulation chamber with respect to the discharge valve, with an other passage portion, which is at a side of the compression chamber with respect to the discharge valve, the second passage defining a valve seat midway therethrough. The fuel pump further comprises a valve element configured to be seated on the valve seat and configured to allow fuel flow substantially only from the accumulation chamber to the compression chamber. The fuel pump further comprises a biasing unit for biasing the valve element to seat the valve element on the valve seat. The second passage has a throttle midway therethrough for restricting fuel flow from the accumulation chamber to the compression chamber. The throttle is defined between a sidewall of the valve element and an inner wall of the second passage.

According to another aspect of the present invention, a fuel pump for pressurizing fuel and pumping the fuel to an accumulation chamber, the fuel pump comprises a housing having a compression chamber and a first passage, the first passage configured to communicate the compression chamber with the accumulation chamber. The fuel pump further comprises a plunger axially movable in the pump housing for pressurizing fuel in the compression chamber. The fuel pump further comprises a discharge valve provided in the first passage and configured to open to supply fuel from the compression chamber to the accumulation chamber in response to increase in pressure in the compression chamber. The fuel pump further comprises a passage member defining a second passage, which is configured to communicate a passage, which is at a side of the accumulation chamber with respect to the discharge valve, with one of the compression chamber and a low pressure portion, the low pressure portion being located upstream of the compression chamber. The fuel pump further comprises a partition member is located in the second passage for partitioning the second passage into one passage portion at a side of the accumulation chamber and an other passage portion at a side of the compression chamber. The partition member includes a columnar core member and an elastic member. The elastic member is in a cylindrical shape and formed of a material further elastic than the core member. The elastic member surrounds an outer circumferential wall surface of the core member. The elastic member is configured to apply predetermined surface pressure to both a portion between an inner circumferential wall of the elastic member and the outer circumferential wall of the core member and to a portion between an outer circumferential wall of the elastic member and an inner circumferential wall defining the second passage.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

Figure 1:
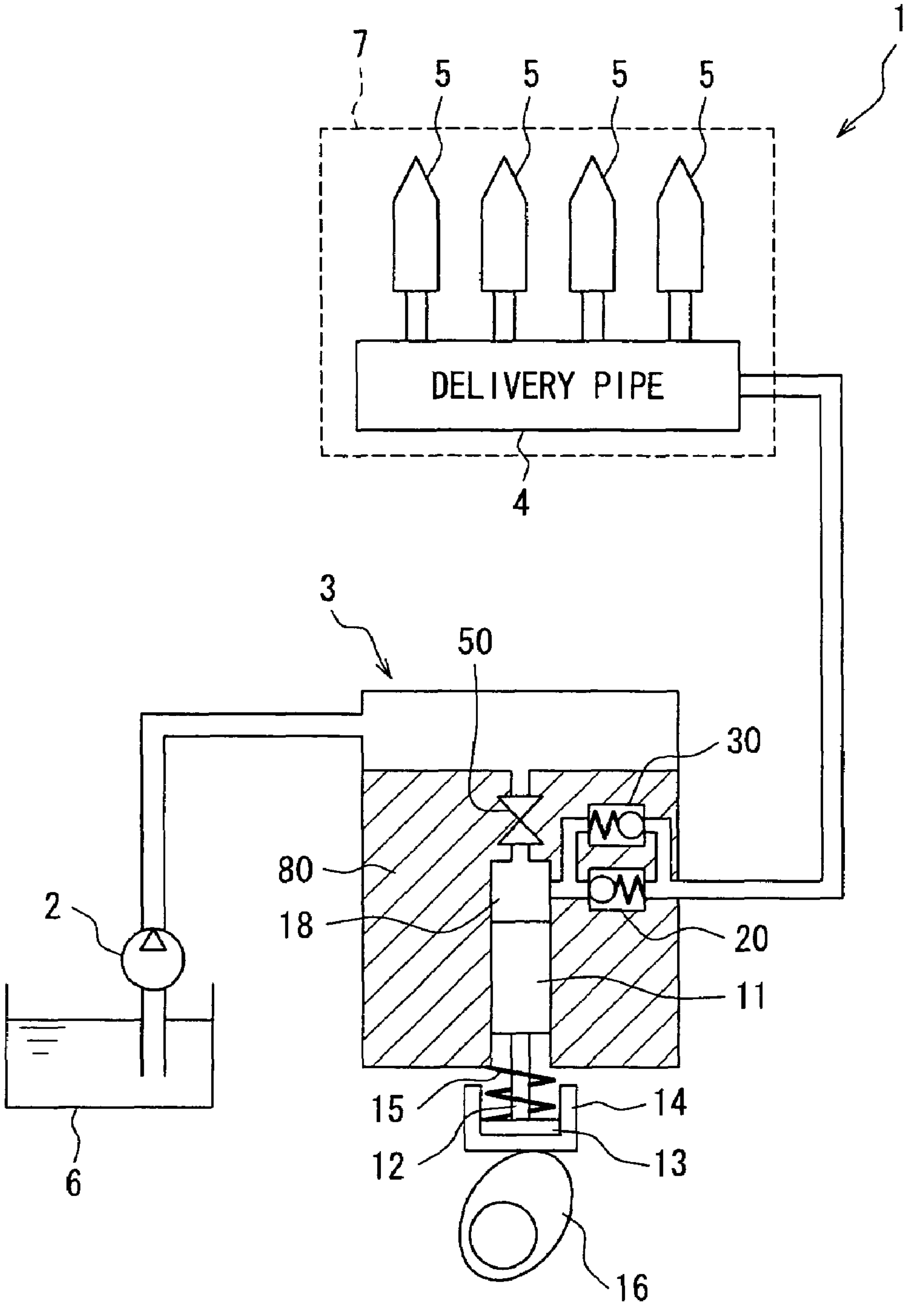
FIG. 1 is a block diagram showing a fuel supply system having a high-pressure fuel pump according to a first embodiment.

FIG. 1 is a schematic view showing a fuel supply system, which includes a high-pressure fuel pump, according to the present first embodiment. The fuel supply system according to the present embodiment is a direct gasoline injection system in which fuel is directly injected into a cylinder of an internal combustion engine such as a gasoline engine.

The fuel supply system 1 is configured by a low-pressure fuel pump 2, a high-pressure fuel pump 3, a delivery pipe 4, fuel injection valves 5, and the like.

The low-pressure fuel pump 2 is an electromotive pump, which draws fuel from a fuel tank 6 and supplies the fuel into the high-pressure fuel pump 3. The high-pressure fuel pump 3 is a plunger pump having a plunger 11 and a compression chamber 18. The plunger 11 pressurizes the fuel, which is supplied from the low-pressure fuel pump 2 into the compression chamber 18, and supplies the fuel into the delivery pipe 4. The high-pressure fuel pump 3 has a discharge valve 20 that opens when pressure of fuel pressurized by the compression chamber 18 increases to a predetermined pressure or more, and supplies the high-pressure fuel into the delivery pipe 4. The delivery pipe 4 is equivalent to an accumulation chamber.

In addition, the high-pressure fuel pump 3 has a relief valve 30 that returns fuel from the downstream side of the high-pressure fuel pump 3 to the compression chamber 18 when pressure at the downstream side exceeds an abnormal pressure. The relief valve 30 is accommodated in a housing of the high-pressure fuel pump 3.

The delivery pipe 4 accumulates fuel being increased in pressure by the high-pressure fuel pump 3. The delivery pipe 4 is connected with the fuel injection valves 5, each of which is provided to each cylinder of an internal combustion engine 7. Each fuel injection valve 5 injects high-pressure fuel supplied from the delivery pipe 4 into a combustion chamber of in each cylinder.

Figure 2:
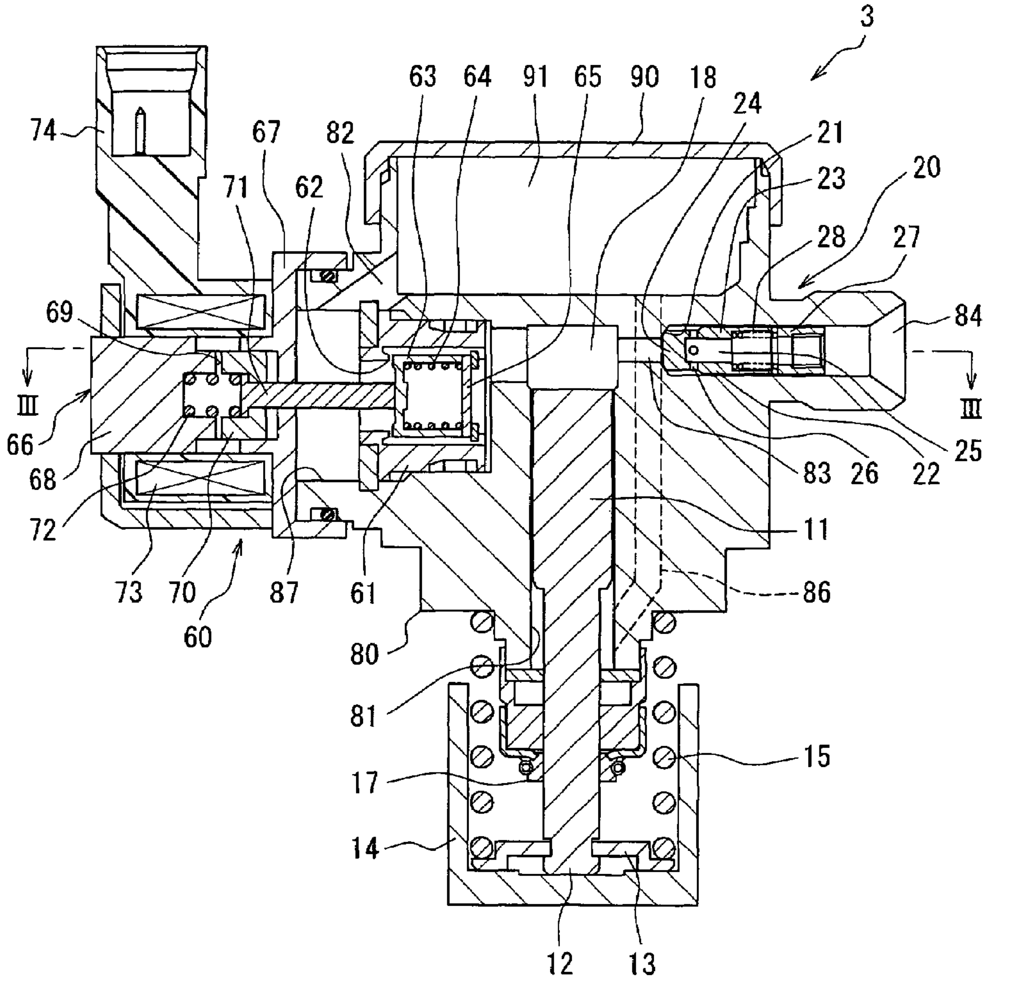
FIG. 2 is a sectional view showing the high-pressure pump.
Figure 3:
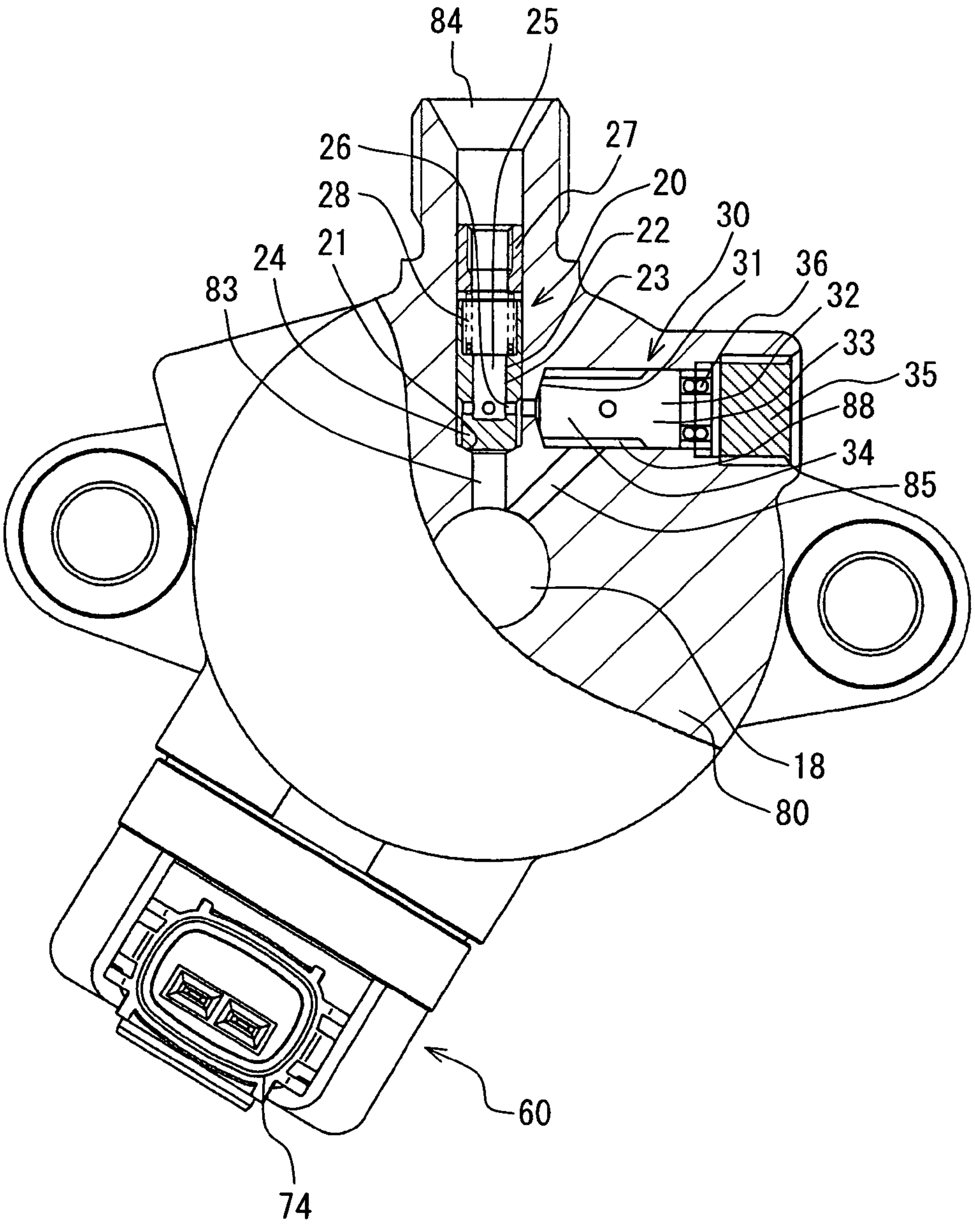
FIG. 3 is a sectional view taken along a line III-III in FIG. 2.
Figure 4:
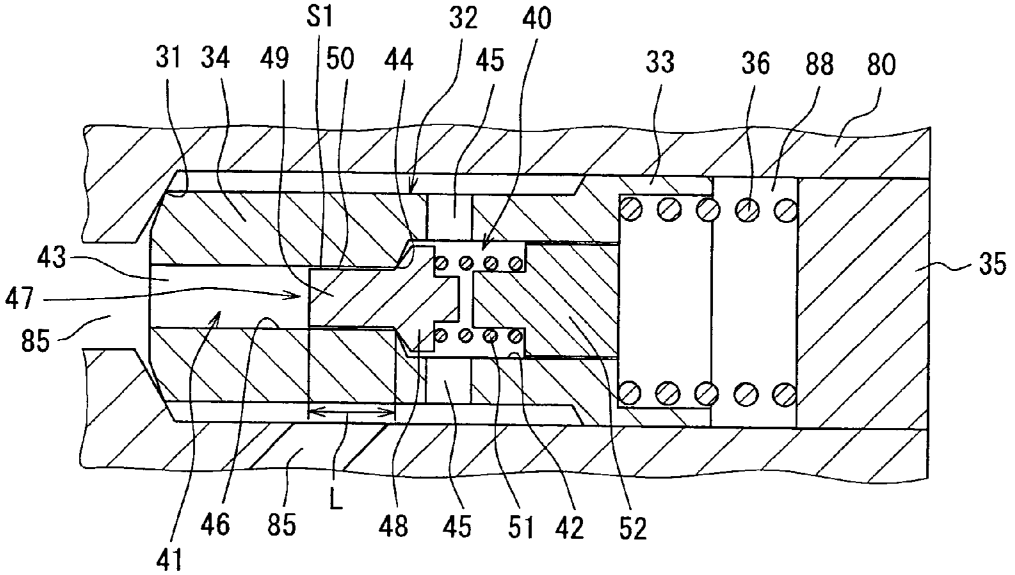
FIG. 4 is a sectional view showing a relief valve of the high-pressure fuel pump shown in FIGS. 2 and 3.

Next, a structure of the high-pressure fuel pump 3 is described in detail according to FIGS. 2 to 4. The high-pressure fuel pump 3 is configured by a cylinder 80, a housing cover 90, the plunger 11, a metering valve 60, the discharge valve 20, the relief valve 30, and the like.

The cylinder 80 and the housing cover 90 configure a housing. The cylinder 80 is formed of stainless steel or the like. The cylinder 80 reciprocatively supports the plunger 11. The cylinder 80 has a sliding portion 81, which is formed with being hardened by induction hardening or the like.

As shown in FIGS. 2 and 3, the cylinder 80 is mounted with a pipe fitting (not-shown), which is connected to the low-pressure fuel pump 2, and the metering valve 60 at a fuel inlet side. The cylinder 80 is further mounted with the discharge valve 20 and the relief valve 30 at a fuel outlet side.

In the cylinder 80, a suction passage 82, the compression chamber 18, a discharge passage 83, a return passage 85, a release passage 86, and the like are formed. The upper end of the cylinder 80 and the housing cover 90 therebetween define a suction chamber 91. The discharge passage 83 has an outlet portion 84 at a fuel outlet side.

The suction passage 82 is configured to communicate the suction chamber 91 with the compression chamber 18. The discharge passage 83 is configured to communicate the compression chamber 18 with the outlet portion 84. The discharge passage 83 is equivalent to a first passage. The return passage 85 is configured to communicate the compression chamber

18 with the discharge passage 83. The release passage 86 is configured to communicate the sliding portion 81 with the suction chamber 91.

The plunger 11 is reciprocatively supported by the sliding portion 81 of the cylinder 80. The compression chamber 18 is provided at one end side of the plunger 11 with respect to the movable direction of the plunger 11. A head 12 is provided to the other end of the plunger 11. The head 12 is connected with a spring seat 161. A spring 15 is provided between a spring seat 13 and the cylinder 80.

The spring seat 13 is biased onto the inner periphery of the bottom wall of a tappet 14 (FIG. 1) by biasing force of the spring 15. Sliding of the outer periphery of the bottom wall of the tappet 14 relative to a cam 16 is accompanied with rotation of the cam 16. The plunger 11 axially moves in conjunction with the rotation of the cam 16.

An oil seal 17 is provided at the end of the sliding portion 81 on the opposite side of the compression chamber 18. The oil seal 17 restricts intrusion of oil from the inside of the internal combustion engine 7 into the compression chamber 18. The oil seal 17 also restricts leakage of fuel from the compression chamber 18 into the internal combustion engine 7. Fuel leaking from a sliding portion between the plunger 11 and the cylinder 80 toward the oil seal 17 is returned from the release passage 86 into the suction chamber 91, which is at a low pressure side. In the present structure, the oil seal 17 is restricted from being applied with high pressure of fuel.

As shown in FIG. 2, the metering valve 60 is configured by a valve seat member 61, a valve member 63, a valve closing spring 64, a spring seat 65, an electromagnetic drive portion 66, and the like. The metering valve 60 controls the amount of fuel drawn from the suction chamber 91 into the compression chamber 18. The valve seat member 61, the valve member 63, the valve closing spring 64, and the spring seat 65 are accommodated in an accommodation hole 87 in the cylinder 80. The accommodation hole 87 is formed midway through the suction passage 82. The bottom of the accommodation hole 87 is connected to the suction passage 82 at the side of the compression chamber 18. The sidewall defining the accommodation hole 87 is connected to the suction passage 82 at the side of the suction chamber 91.

The valve seat member 61 is in a cylindrical shape, and supported by the sidewall of the accommodation hole 87. The valve seat member 61 has an inner circumferential wall defining a valve seat 62, on which the valve member 63 is seated. The valve member 63 is in a bottomed cylindrical shape and accommodated in the valve seat member 61 such that the outer wall of a bottom of the valve member 63 is seated on the valve seat 62. The valve closing spring 64 is accommodated in an inner circumferential wall of the valve member 63.

The valve closing spring 64 is supported at one end by the spring seat 65 mounted in the valve seat member 61. The valve closing spring 64 is supported at the other end by an inner wall of a bottom of the valve member 63. The valve member 63 is applied with biasing force of the valve closing spring 64 and urged in a direction, in which the valve member 63 is seated on the valve seat 62. When the valve member 63 is seated on the valve seat 62, the suction chamber 91 is blockaded from the compression chamber 18.

The electromagnetic drive portion 66 is configured by a body 67, a stationary core 68, a movable core 70, a pin 71, a valve-opening spring 72, a coil 73, a connector 74, and the like.

The body 67 covers the opening of the accommodation hole 87 and supports the stationary core 68, which is made from a magnetic material. The stationary core 68 has an attractive portion 69.

The movable core 70 is made from a magnetic material and provided at the side of the attractive portion 69 of the stationary core 68. The movable core 70 is coupled with the pin 71, which is provided to extend through the body 67. The attractive portion 69 generates magnetic attractive force with respect to the movable core 70 for drawing the movable core 70. The pin 71 reciprocates together with the movable core 70 so as to move the valve member 63 in a lifting and seating direction.

The valve-opening spring 72 is provided between the stationary core 68 and the movable core 70. Biasing force of the valve-opening spring 72 is larger than biasing force of the valve closing spring 64. Therefore, when the attractive portion 69 does not generate magnetic attractive force, the movable core 70 moves in a direction in which the movable core 70 is separated from the stationary core 68. That is, the movable core 70 moves in a direction in which the valve member 63 is lifted from the valve seat 62. As a result, the suction chamber 91 communicates with the compression chamber 18.

The coil 73 is provided at a radially outer side of the stationary core 68. The connector 74 is provided at a radially outer side of the coil 73 for supplying electric power to the coil 73. When the coil 73 is supplied with external electric power, magnetic force passing through the stationary core 68 and the movable core 70 is generated, so that magnetic attractive force is exerted between the attractive portion 69 and the movable core 70. The movable core 70 moves toward the stationary core 68 by being exerted with the magnetic attractive force, and thus the valve member 63 is seated on the valve seat 62. As a result, the suction chamber 91 is blockaded from the compression chamber 18.

As shown in FIGS. 2 and 3, the discharge valve 20 has a valve seat 21, a valve element 22, a stopper 27, and a spring 28. The discharge valve 20 is accommodated in the discharge passage 83. An inner wall of the discharge passage 83 defines the valve seat 21. The valve element 22 is in an approximately cylindrical shape and provided closer to the outlet portion 84 than the valve seat 21. The valve element 22 has a large diameter portion 23 and a small diameter portion 24. The large diameter portion 23 is slidably supported by the discharge passage 83. The small diameter portion 24 is closer to the compression chamber 18 than the large diameter portion 23. The valve element 22 moves toward the compression chamber 18, thereby a tip end of the small diameter portion 24 is seated on the valve seat 21.

Multiple through-holes 26 are formed in the sidewall of the small diameter portion 24. The through-holes 26 communicate with a fuel passage 25, which is formed in the valve element 22. In the present structure, when the valve element 22 is lifted from the valve seat 21, fuel flows into the gap between the small diameter portion 24 and the discharge passage 83. The fuel then flows into the fuel passage 25 through the through holes 26, and then flows into the outlet portion 84.

The stopper 27 is in an approximately cylindrical shape and provided closer to the outlet portion 84 than the valve element 22. The stopper 27 is fixed to the discharge passage 83 and configured to restrict movement of the valve element 22 toward the outlet portion 84. The spring 28 is provided between the stopper 27 and the large diameter portion 23 of the valve element 22. The spring 28 biases the stopper 27 and the valve element 22 such that the stopper 27 is apart from the valve element 22. Thus, the small diameter portion 24 of the valve element 22 is seated on the valve seat 21, so that the compression chamber 18 is blockaded from the outlet portion 84.

When differential pressure is exerted from both the side at the compression chamber 18 and the side at the outlet portion 84 to the valve element 22 and force exerted on a tip end of the small diameter portion 24 of the valve element 22 exceeds the biasing force of the spring 28, the valve element 22 is lifted from the valve seat 21. Consequently, the compression chamber 18 communicates with the outlet portion 84.

Here, the stopper 27 is fixed to the discharge passage 83 by being press fitted or the like. The movement of the valve element 22 and the load exerted by the spring 28 can be controlled by adjusting the position of the stopper 27 inside the discharge passage 83.

As shown in FIG. 3, the relief valve 30 has a valve seat 31, a valve element 32, a stopper 35, a spring 36, a and a pressure holding mechanism 40, and is accommodated in an accommodation hole 88 formed midway through the return passage 85. The return passage 85 is configured to communicate the discharge passage 83 with the compression chamber 18. The return passage 85 opens to the discharge passage 83 at one end so as to communicate with the gap formed between the small diameter portion 24 of the valve element 22 of the discharge valve 20 and the discharge passage 83. The return passage 85 opens to the compression chamber 18 at the other end. A bottom of the accommodation hole 88 is connected to the return passage 85 at the side of the discharge valve 20. The sidewall of the accommodation hole 88 is connected to the return passage 85 at the side of the compression chamber 18.

The periphery of the opening of the return passage 85 at the side of the bottom of the accommodation hole 88 defines the valve seat 31. The valve element 32 is in approximately cylindrical shape, and accommodated in the accommodation hole 88. The valve element 32 has a large diameter portion 33 and a small diameter portion 34. The large diameter portion 33 is slidably supported by the accommodation hole 88. The small diameter portion 34 is provided closer to the discharge valve 20 than the large diameter portion 33. The valve element 32 moves toward the discharge valve 20, thereby a tip end of the small diameter portion 34 is seated on the valve seat 31.

The stopper 35 is in an approximately cylindrical shape, and provided closer to the opening of the accommodation hole 88 than the valve element 32. The stopper 35 is fixed to the accommodation hole 88, so that the stopper 35 closes the opening of the accommodation hole 88. The stopper 35 restricts the valve element 32 from moving toward the opening, thereby restricting the valve element 32 from being detached from the accommodation hole 88.

The spring 36 is provided between the stopper 35 and the large diameter portion 33 of the valve element 32. The spring 36 biases the stopper 35 and the valve element 32 such that the stopper 35 is apart from the valve element 32. Thus, the small diameter portion 34 of the valve element 32 is seated on the valve seat 31, so that communication between the discharge passage 83 and the compression chamber 18 is blockaded. The spring 36 exerts biasing force such that the valve element 32 maintains closing as long as pressure in the discharge passage 83 at the side of the outlet portion 84 with respect to the valve element 32 is equal to of less than abnormal pressure. That is, the valve element 32 maintains closing as long as pressure in the delivery pipe 4 is equal to of less than the abnormal pressure.

When fuel pressure in the delivery pipe 4 exceeds abnormal pressure, and thus force exerted on a tip end of the small diameter portion 34 of the valve element 32 exceeds biasing force of the spring 36, the valve element 32 moves toward the opening of the accommodation hole 88, and the valve element 32 is lifted from the valve seat 31. As a result, the discharge passage 83 communicates with the compression chamber 18, and whereby high-pressure fuel in the delivery pipe 4 returns into the compression chamber 18.

Next, a structure of the valve element 32 of the relief valve 30 is described further in detail according to FIG. 4. The valve element 32 therein has the pressure holding mechanism 40. The pressure holding mechanism 40 has a fuel passage 41, a valve needle 47, a spring 51, and a stopper 52. The fuel passage 41 extends through both the large diameter portion 33 and the small diameter portion 34 of the valve element 32. The fuel passage 41 includes a large diameter passage 42 and a small diameter passage 43.

The small diameter passage 43 is provided at the side of the small diameter portion 34 with respect to the large diameter passage 42. The small diameter passage 43 and the large diameter passage 42 therebetween define a valve seat 44, on which the valve needle 47 is seated. The small diameter portion 34 has through holes 45, which communicate a passage around the sidewall of the small diameter portion 34 with the large diameter passage 42.

The fuel passage 41 communicates with the discharge passage 83 at the side of the outlet portion 84 through the return passage 85 at the side of the discharge passage 83. Namely, the fuel passage 41 communicates with the discharge passage 83 at the side of the delivery pipe 4 with respect to the discharge valve 20. Moreover, the fuel passage 41 communicates with the compression chamber 18 through the through holes 45 and the return passage 85 at the side of the compression chamber 18. Namely, the fuel passage 41 communicates with a passage at the side of the compression chamber 18 with respect to the discharge valve 20. The fuel passage 41 and the return passage 85 are equivalent to a second passage.

The valve needle 47 has a valve element portion 48 and a cylindrical portion 49. The outer diameter of the valve element portion 48 is larger than the inner diameter of the small diameter passage 43. The outer diameter of the valve element portion 48 is smaller than the inner diameter of the large diameter passage 42. The valve element portion 48 is accommodated in the large diameter passage 42. The valve element portion 48 is configured to be lifted from the valve seat 44 and seated on the valve seat 44. When the valve element portion 48 is seated on the valve seat 44, the discharge valve 20 blockades the delivery pipe 4 from the compression chamber 18. The valve needle 47 is equivalent to a valve element.

The cylindrical portion 49 is in an approximately cylindrical shape. The cylindrical portion 49 extends from the end of the valve element portion 48 at the side of the small diameter passage 43 along the axial direction of the small diameter passage 43. The cylindrical portion 49 has the sidewall defining a sliding portion 50, which is slidable relative to the small diameter passage 43, and whereby the cylindrical portion 49 is slidably supported by an inner wall 46 of the small diameter passage 43. The sliding portion 50 of the cylindrical portion 49 is equivalent to the sidewall, and the inner wall 46 of the small diameter passage 43 is equivalent to an inner wall of the second passage.

The sliding portion 50 and the inner wall 46 therebetween define a sliding gap S1. The sliding gap S1 is configured to restrict an amount of fuel flowing from the small diameter passage 43 into the large diameter passage 42. The sliding gap S1 is equivalent to a throttle portion.

The cylindrical portion 49 moves in the small diameter passage 43, thereby the valve element portion 48 can be stably moved in the lifting and seating direction. Thus, the valve element portion 48 can be securely allowed to be lifted from or seated on the valve seat 44. The valve element portion 48 can be further stably operated by increasing the length of the cylindrical portion 49 in the axial direction. Since the cylindrical portion 49 is small in outer diameter compared with the valve element portion 48, stability of operation of the valve element portion 48 can be enhanced while reduction in response due to increase in weight of the valve needle 47 is suppressed to the utmost.

As shown in FIG. 4, an axial distance L of the sliding gap S1 is maximum when the valve element portion 48 is seated on the valve seat 44. As the valve element portion 48 is farther from the valve seat 44, the axial distance L decreases. That is, as the axial distance L is shorter, sliding resistance between the cylindrical portion 49 and the inner wall 46 of the small diameter passage 43 decreases. Specifically, the valve element portion 48 is excellent in response in the case where the valve element portion 48 is moved to be seated on the valve seat 44 from a lifted condition to a seated condition, compared with the case where the valve element portion 48 starts to be lifted by moving from the seated condition to the lifted condition. That is, the valve element portion 48 is structured to hardly open but easily close.

A stopper 52 is provided at a side opposite to the cylindrical portion 49 of the valve element portion 48. The spring 51 is provided between the valve element portion 48 and the stopper 52. The spring 51 biases the valve element portion 48 to urge the valve element portion 48 toward the valve seat 44. The spring 51 is equivalent to a biasing unit. When differential pressure is exerted from both the side at the discharge passage 83 and the side at the compression chamber 18 to the valve needle 47 and force exerted on the cylindrical portion 49 exceeds the biasing force of the spring 51, the valve element portion 48 is lifted from the valve seat 44. Whereby, the passage at the side of the delivery pipe 4 is communicated with the compression chamber 18 through the relief valve 30.

Biasing force of the spring 51 is determined such that the valve needle 47 can be closed in the case where the high-pressure fuel pump 3 stops and fuel pressure in the delivery pipe 4 becomes lower than fuel pressure in a normal operation of the internal combustion engine 7. Thus, fuel pressure in the delivery pipe 4 can be maintained at a predetermined fuel pressure higher than the discharge pressure (feed pressure) of the low-pressure fuel pump 2.

As follows, an operation of the high pressure fuel pump 3 is described.

(1) Suction Stroke

In the case where the plunger 11 moves downward, the coil 73 of the metering valve 60 is not supplied with electric power. The plunger 11 moves downward, whereby fuel pressure in the compression chamber 18 decreases, and fuel in the suction chamber 91 is drawn into the compression chamber 18 through the suction passage 82. Current application to the coil 73 of the metering valve 60 is terminated until the plunger 11 reaches the bottom dead center.

(2) Return Stroke

Even in the condition where the plunger 11 moves upward from the bottom dead center to the top dead center, current application to the coil 73 is still terminated. Therefore, fuel is returned from the compression chamber 18 into the suction chamber 91 through the metering valve 60.

(3) Press-Feed Stroke

When the current application to the coil 73 is activated in the return stroke, the attractive portion 69 of the stationary core 68 generates magnetic attractive force, and the movable core 70 and the pin 71 are attracted by the attractive portion 69. As a result, the valve member 63 is seated on the valve seat 62, so that communication between the compression chamber 18 and the suction chamber 91 is blockaded, and consequently fuel flow from the compression chamber 18 into the suction chamber 91 stops.

In the present state, when the plunger 11 further moves upward to the top dead center, fuel in the compression chamber 18 is further pressurized, whereby the fuel pressure in the compression chamber 18 increases. Thus, fuel pressure in the compression chamber 18 increases. When the fuel pressure in the compression chamber 18 becomes greater than predetermined pressure, the valve element 22 of the discharge valve 20 is lifted from the valve seat 21 against the biasing force of the spring 28, whereby the discharge valve 20 is opened. In the present condition, fuel, which is pressurized in the compression chamber 18, is discharged from the outlet portion 84. The fuel discharged from the outlet portion 84 is supplied into the delivery pipe 4 as shown in FIG. 1.

The high-pressure fuel pump 3 pumps fuel by repeating the suction stroke, the return stroke, and the press-feed stroke. The metering valve 60 controls the discharge amount of fuel by controlling the timing of energizing the coil 73 of the metering valve 60.

In at least the suction stroke and the return stroke, since fuel pressure in the compression chamber 18 is lower than fuel pressure in the delivery pipe 4, the valve element portion 48 of the valve needle 47 accommodated in the relief valve 30 is lifted from the valve seat 44. Therefore, fuel returns from the delivery pipe 4 to the compression chamber 18 through the return passage 85 and the fuel passage 41 of the relief valve 30.

However, in the fuel passage 41, since the sliding gap S1 is formed between the sliding portion 50 on the sidewall of the cylindrical portion 49 of the valve needle 47 and the inner wall 46 of the small diameter passage 43, the sliding gap S1 restricts flow of the fuel from the delivery pipe 4. Therefore, reduction in volume efficiency of the high-pressure fuel pump 3, which is caused by returning fuel discharged from the compression chamber 18 into the compression chamber 18, can be suppressed.

When operation is shifted to the press-feed stroke, fuel pressure in the compression chamber 18 becomes temporarily higher than fuel pressure in the delivery pipe 4. Therefore, the valve element portion 48 of the valve needle 47 is seated on the valve seat 44. Thus, the fuel flow from the delivery pipe 4 into the compression chamber 18 stops.

As described above, the valve needle 47 repeatedly opens and closes by repeating the suction stroke, the return stroke, and the press-feed stroke. As described above, the valve needle 47 is structured such that the cylindrical portion 49 is slidably supported by the small diameter passage 43 at the side of the delivery pipe 4 with respect to the valve element portion 48, therefore the valve needle hardly opens but easily closes. Therefore, when the operation is shifted to the suction stroke after the press-feed stroke, fuel in the delivery pipe 4 can be restricted from returning into the compression chamber 18, since the valve needle 47 hardly opens.

In addition, at a time point immediately after the high-pressure fuel pump 3 stops, the valve needle 47 opens since fuel pressure in the delivery pipe 4 is higher than fuel pressure in the compression chamber 18. Therefore, fuel returns from the delivery pipe 4 into the compression chamber 18 through the sliding gap S1, and consequently fuel pressure in the delivery pipe 4 decreases.

The valve needle 47 is biased in a valve closing direction by the spring 51. Therefore, when the fuel pressure in the delivery pipe 4 decreases to a predetermined pressure, the valve needle 47 closes the small diameter passage 43. As a result, fuel pressure in the delivery pipe 4 can be maintained at the feed pressure or more. According to the present structure, when the high-pressure fuel pump 3 is restarted, the fuel pressure in the delivery pipe 4 can be increased to a fuel pressure suited to a normal operation in a short time.

In the present embodiment, the sliding gap S1 is formed between the sliding portion 50 of the cylindrical portion 49 of the valve needle 47 and the inner wall 46 of the small diameter passage 43 to produce a throttle function so as to restrict the amount of fuel returning from the delivery pipe 4 to the compression chamber 18. The sliding gap S1 is formed by components necessary for keeping the fuel pressure in the delivery pipe 4 at the predetermined pressure when the high-pressure fuel pump 3 is stopped. That is, the throttle function is produced without adding components other than originally needed components. According to the present structure, the sliding gap S1 can be formed by simple assembling of inserting the cylindrical portion 49 of the valve needle 47 into the small diameter passage 43. Moreover, a portion for producing the throttle function need not be separately applied with a machining work.

Moreover, in the present embodiment, the valve needle 47 and the like are provided in the relief valve 30, which does not operate in a normal operation of the high-pressure fuel pump 3. Therefore, the valve needle 47 can be stably operated.

(Second Embodiment)

Figure 5:
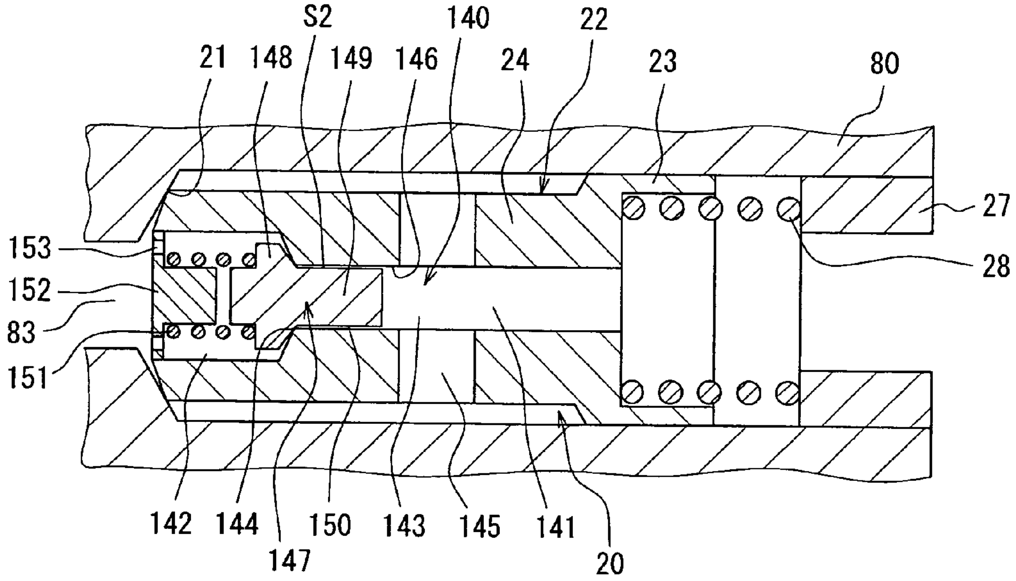
FIG. 5 is a sectional view showing a discharge valve of the high-pressure fuel pump according to a second embodiment.

In the second embodiment shown in FIG. 5, a mechanism similar to the pressure holding mechanism 40, which is provided in the relief valve 30 in the first embodiment, is provided in the discharge valve 20.

The pressure holding mechanism 140 provided in the discharge valve 20 has a fuel passage 141, a valve needle 147, a spring 151, and a stopper 152. The fuel passage 141 extends through the large diameter portion 23 and the small diameter portion 24 of the valve element 22 of the discharge valve 20. The fuel passage 141 includes a large diameter passage 142 and a small diameter passage 143.

The small diameter passage 143 is provided at a side of the outlet portion 84 with respect to the large diameter passage 142. The large diameter passage 142 and the small diameter passage 143 therebetween define a valve seat 144, on which the valve needle 147 is seated. The small diameter portion 24 has through holes 145, which communicate a passage around the sidewall of the small diameter portion 24 with the small diameter passage 143.

The fuel passage 141 communicates with the discharge passage 83 at the side of the outlet portion 84. Namely, the fuel passage 141 communicates with the passage at the side of the delivery pipe 4 with respect to the discharge valve 20. Moreover, the fuel passage 141 communicates with the compression chamber 18 through the through holes 145 and the gap between the small diameter portion 24 and the discharge passage 83. Namely, the fuel passage 141 communicates with the passage at the side of the compression chamber 18 with respect to the discharge valve 20. In the present embodiment, the fuel passage 141 is equivalent to a second passage.

The valve needle 147 has a valve element portion 148 and a cylindrical portion 149. The outer diameter of the valve element portion 148 is larger than the inner diameter of the small diameter passage 143 but smaller than the inner diameter of the large diameter passage 142. When the valve element portion 148 is seated on the valve seat 144, the passage at the side of the delivery pipe 4 with respect to the discharge valve 20 is blockaded from the passage at the side of the compression chamber 18.

The cylindrical portion 149 is in an approximately cylindrical shape. The cylindrical portion 149 extends from the end of the valve element portion 148 at the side of the small diameter passage 143 along the axial direction of the small diameter passage 143. The cylindrical portion 149 has the sidewall defining a sliding portion 150, which is slidable on an inner wall 146 of the small diameter passage 143. The cylindrical portion 149 is slidably supported by the inner wall 146.

A sliding gap S2 is formed between the sliding portion 150 and the inner wall 146. The sliding gap S2 is configured to restrict an amount of fuel flowing from the small diameter passage 143 into the large diameter passage 142. The sliding gap S2 is equivalent to a throttle portion. The amount of fuel passing through the sliding gap S2 can be further restricted by increasing the axial length of the cylindrical portion 149. The cylindrical portion 149 is small in diameter compared with the valve element portion 148. Therefore, even when the cylindrical portion 149 is elongated in the axial direction, increase in weight of the valve needle 147 can be suppressed.

The cylindrical portion 149 moves in the small diameter passage 143, thereby the valve element portion 148 can be stably moved in the lifting and seating direction. Thus, the valve element portion 148 can be securely allowed to be lifted from or seated on the valve seat 144.

In the present structure of the pressure holding mechanism 140, as in the pressure holding mechanism 40 in the first embodiment, the valve needle 147 can be structured to hardly open but easily close.

The stopper 152 is provided at the side opposite to the cylindrical portion 149 of the valve element portion 148. The stopper 152 has through holes 153 to lead fuel from the large diameter passage 142 into the discharge passage 83 at the side of the compression chamber 18. The spring 151 is provided between the valve element portion 148 and the stopper 152. The spring 151 biases the valve element portion 148 to urge the valve element portion 148 toward the valve seat 144.

Similarly to the first embodiment, biasing force of the spring 151 is determined such that the valve needle 147 can be closed in the case where the high-pressure fuel pump 3 stops and fuel pressure in the delivery pipe 4 becomes lower than fuel pressure in a normal operation of the internal combustion engine 7. Thus, fuel pressure in the delivery pipe 4 can be maintained at a predetermined fuel pressure higher than the discharge pressure (feed pressure) of the low-pressure fuel pump 2.

According to the pressure holding mechanism 140 configured in this way, the same advantage as in the pressure holding mechanism 40 in the first embodiment is exhibited. In the suction stroke and the return stroke, fuel pressure in the compression chamber 18 is lower than fuel pressure in the delivery pipe 4, and hence the discharge valve 20 closes. In this condition, the valve element portion 148 of the valve needle 147 is lifted from the valve seat 144. Therefore, fuel at the side of the delivery pipe 4 returns to the compression chamber 18 through the fuel passage 141.

However, in the fuel passage 141, since the sliding gap S2 is formed between the sliding portion 150 on the sidewall of the cylindrical portion 149 of the valve needle 147 and the inner wall 146 of the small diameter passage 143, the sliding gap S2 restricts flow of the fuel from the delivery pipe 4. Therefore, reduction in volume efficiency of the high-pressure fuel pump 3 can be suppressed.

In the press-feed stroke, fuel pressure in the compression chamber 18 is higher than fuel pressure in the delivery pipe 4, and hence the discharge valve 20 opens. In this condition, the valve element portion 148 of the valve needle 147 is seated on the valve seat 144. Thus, the fuel flow from the delivery pipe 4 into the compression chamber 18 stops.

As described above, in the present second embodiment, the valve needle 147 also repeatedly opens and closes by repeating the suction stroke, the return stroke, and the press-feed stroke. As described above, the valve needle 147 is structured such that the cylindrical portion 149 is slidably supported by the small diameter passage 143 at the side of the delivery pipe 4 with respect to the valve element portion 148, therefore the valve needle hardly opens but easily closes. Therefore, when the operation is shifted to the suction stroke after the press-feed stroke, fuel in the delivery pipe 4 can be restricted from returning into the compression chamber 18, since the valve needle 147 hardly opens.

In addition, at a time point immediately after the high-pressure fuel pump 3 stops, the discharge valve 20 closes and the valve needle 147 opens since fuel pressure in the delivery pipe 4 is higher than fuel pressure in the compression chamber 18. Therefore, fuel returns from the delivery pipe 4 into the compression chamber 18 through the sliding gap S2, and consequently fuel pressure in the delivery pipe 4 decreases.

The valve needle 147 is biased in the valve closing direction by the spring 151. Therefore, when the fuel pressure in the delivery pipe 4 decreases to a predetermined pressure, the valve needle 147 closes. As a result, fuel pressure in the delivery pipe 4 can be maintained at the feed pressure or more. According to the present structure, when the high-pressure fuel pump 3 is restarted, the fuel pressure in the delivery pipe 4 can be increased to a fuel pressure suited to a normal operation in a short time.

The sliding gap S2 is formed between the sliding portion 150 of the cylindrical portion 149 of the valve needle 147 and the inner wall 146 of the small diameter passage 143 to produce a throttle function so as to restrict the amount of fuel returning from the delivery pipe 4 to the compression chamber 18. According to the present embodiment, the sliding gap S2 can be also formed by simple assembling of inserting the cylindrical portion 149 of the valve needle 147 into the small diameter passage 143. Moreover, a portion for producing the throttle function need not be separately applied with a machining work.

The structure as in the present embodiment, in which the pressure holding mechanism 140 is provided in the discharge valve 20, is particularly effective in the case where the high-pressure fuel pump 3 does not have the relief valve.

Figure 6:
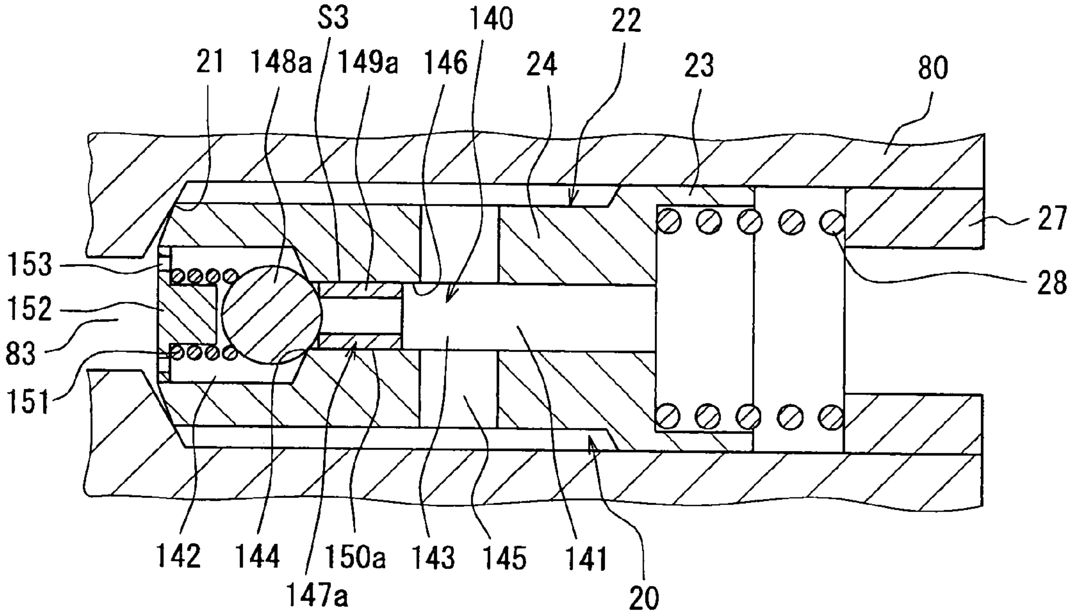
FIG. 6 is a sectional view showing a discharge valve of the high-pressure fuel pump according to a modification of the second embodiment.

FIG. 6 shows a modification of the second embodiment. In the present modification, the valve element portion 148 (refer to FIG. 5) of the valve needle 147*a* is in a form of a ball valve 148*a*. A cylindrical portion 149*a* is fixed to the end of the ball valve 148*a* at the side of the small diameter passage 143 by welding or the like. The sidewall of the cylindrical portion 149*a* defines a sliding portion 150*a,* which is slidable on the inner wall 146 of the small diameter passage 143. A sliding gap S3 is formed between the sliding portion 150*a* and the inner wall 146. Other structures are substantially the same as in FIG. 5, therefore description of them is omitted.

(Third Embodiment)

Figure 7:
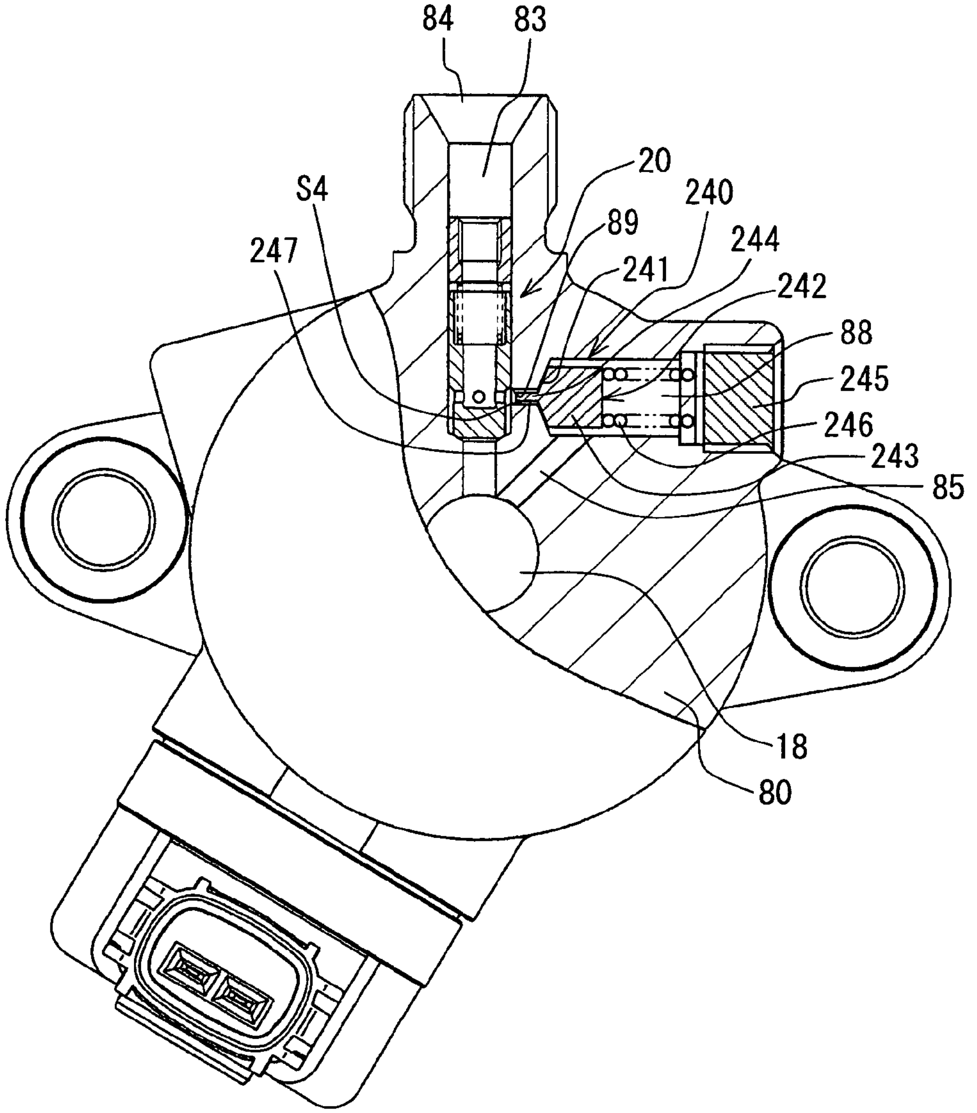
FIG. 7 is a partial sectional view showing a high-pressure fuel pump according to a third embodiment.

In the third embodiment shown in FIG. 7, a pressure holding mechanism 240 is provided in the accommodation hole 88. In the first embodiment, the relief valve 30 is accommodated in the accommodation hole 88.

The pressure holding mechanism 240 has a valve seat 241, a valve needle 242, a spring 246, and a stopper 245. A periphery of the opening of the return passage 85 at the side of the bottom of the accommodation hole 88 defines the valve seat 241. In the present embodiment, the return passage 85 with the accommodation hole 88 is equivalent to a second passage.

The valve needle 242 is in an approximately cylindrical shape and has a valve element portion 243 and a cylindrical portion 244. The valve element portion 243 is accommodated in the accommodation hole 88. The valve seat 241 is lifted from and seated on the bottom of the accommodation hole 88. The cylindrical portion 244 is accommodated in the return passage 85 at the bottom side of the accommodation hole 88. The sidewall of the cylindrical portion 244 defines a sliding portion 247. The sliding portion 247 slides on an inner circumferential wall 89 of the return passage 85, The sliding portion 247 of the cylindrical portion 244 and the inner circumferential wall 89 of the return passage 85 therebetween define a sliding gap S4. The sliding gap S4 restricts the amount of fuel returning from the delivery pipe 4 to the compression chamber 18.

The stopper 245 is in an approximately cylindrical shape, and provided closer to the opening of the accommodation hole 88 than the valve element portion 243. The stopper 245 is fixed to the accommodation hole 88, so that the stopper 245 closes the opening of the accommodation hole 88. The stopper 245 restricts the valve needle 242 from moving toward the opening, thereby restricting the valve needle 242 from being detached from the accommodation hole 88.

The spring 246 is provided between the stopper 245 and the valve element portion 243. The spring 246 biases the valve element portion 243 to urge the valve element portion 243 toward the valve seat 241. Similarly to the first embodiment, biasing force of the spring 246 is determined such that the valve needle 242 can be closed in the case where the high-pressure fuel pump 3 stops and fuel pressure in the delivery pipe 4 becomes lower than fuel pressure in a normal operation of the internal combustion engine 7. Thus, fuel pressure in the delivery pipe 4 can be maintained at a predetermined fuel pressure higher than the discharge pressure (feed pressure) of the low-pressure fuel pump 2.

Since the operation of the valve needle 242 is substantially the same as the operation of the valve needle 47 in the first embodiment, description of the operation is omitted. According to the present embodiment, the sliding gap S2 can be also formed by simple assembling of inserting the cylindrical portion 244 of the valve needle 242 into the return passage 85, similarly to the first embodiment. Moreover, a portion for producing the throttle function need not be separately applied with a machining work.

According to the present embodiment, the pressure holding mechanism 240 is provided in the high-pressure fuel pump 3 by using the accommodation hole 88 of the relief valve 30. Therefore, even when the relief valve 30 is provided outside the high-pressure fuel pump 3, the cylinder 80 having the accommodation hole 88 for accommodating the relief valve 30 can be used. Therefore, the cylinder 80 need not be separately produced depending on whether the relief valve 30 is provided outside or not. That is, commonality of the cylinder 80 can be achieved.

(Fourth Embodiment)

Figure 8:
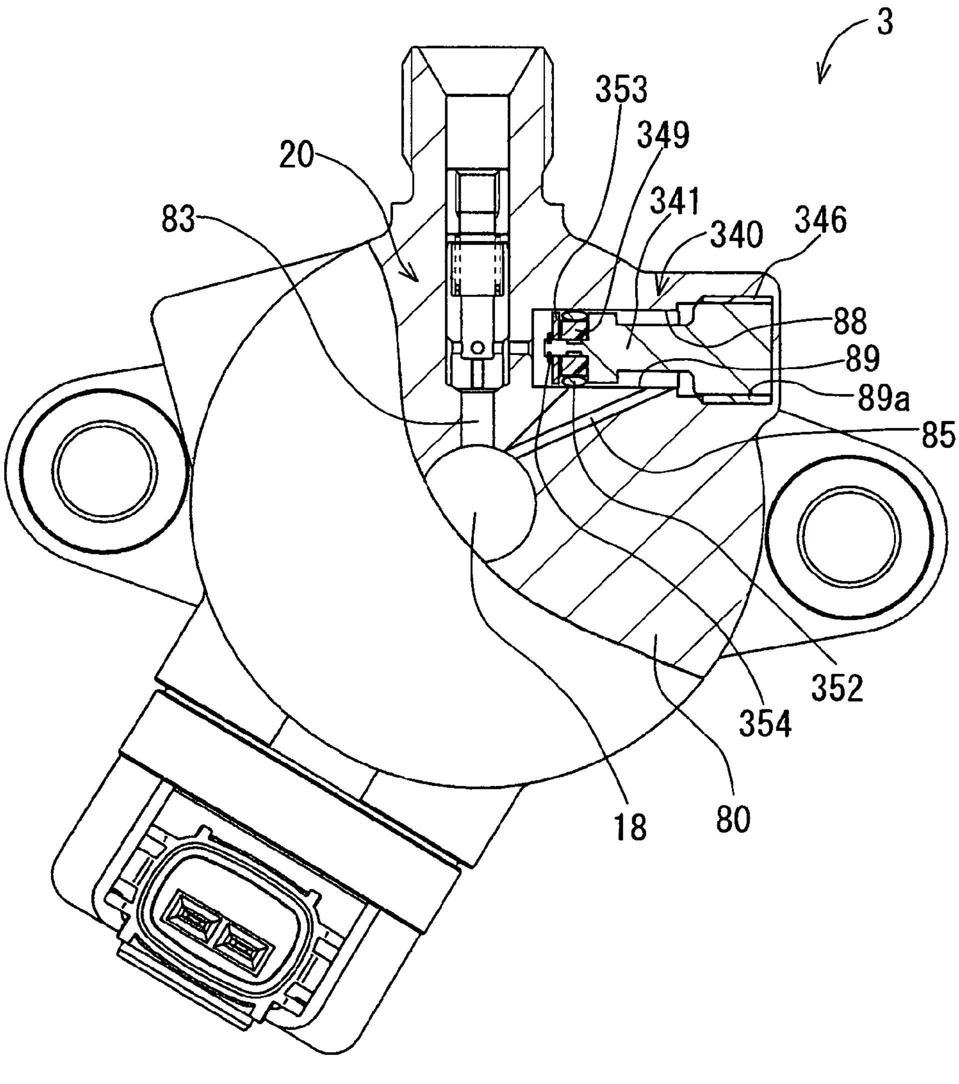
FIG. 8 is a partial sectional view showing a high-pressure fuel pump according to a fourth embodiment.

In the high-pressure fuel pump 3 shown in FIG. 8, a pressure holding mechanism 340 as a partition member is provided in place of the relief valve 30 accommodated in the accommodation hole 88 of the high-pressure fuel pump 3 according to the first embodiment. In the high-pressure fuel pump 3 according to the present forth embodiment described below, substantially the same components as in the first embodiment are marked with the same references, and description of them is omitted.

The pressure holding mechanism 340 includes a plug 341, a cylindrical member 349, an O-ring 352, a washer 353, and a clasp 354, and accommodated in the accommodation hole 88. The pressure holding mechanism 340 is accommodated in a way that the accommodation hole 88 is partitioned into a portion at the side of the delivery pipe 4 and a portion at the side of the compression chamber 18. In the present embodiment, the accommodation hole 88 with the return passage 85 is equivalent to a second passage.

Figure 9:
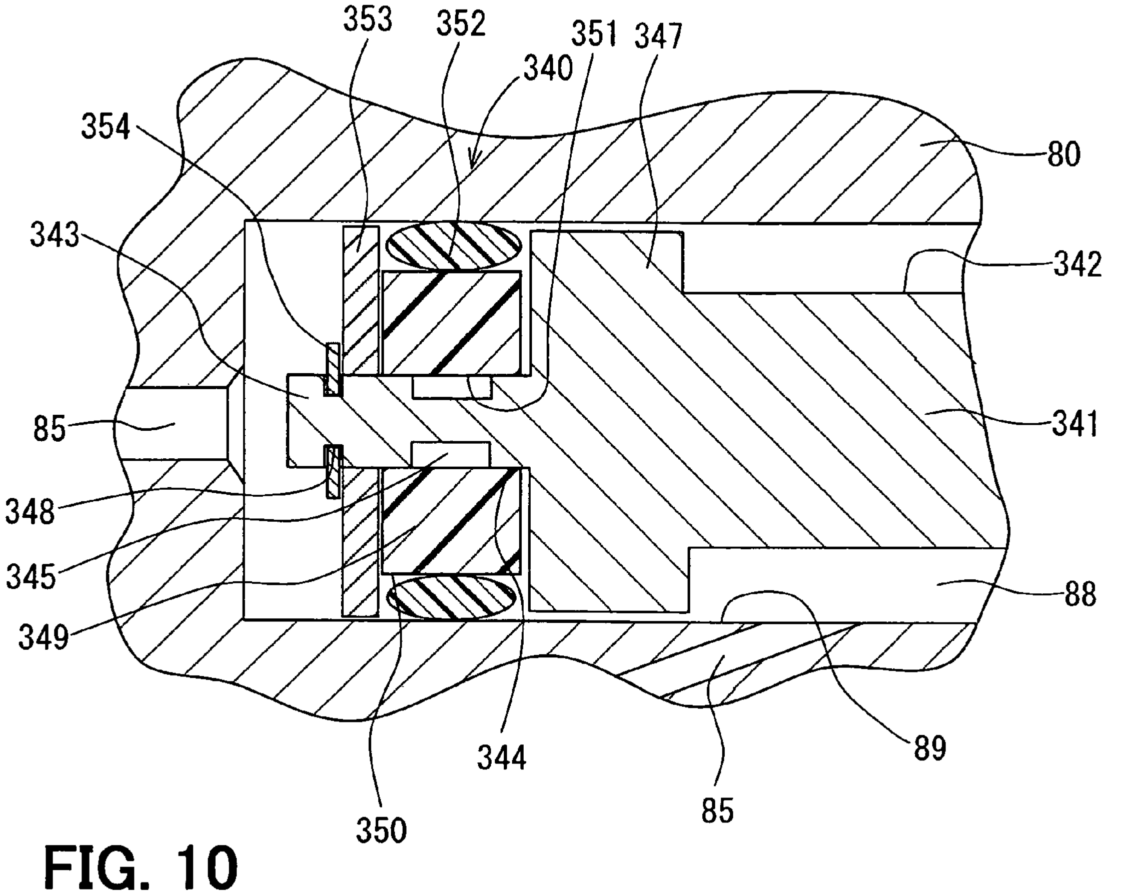
FIG. 9 is a sectional view showing a pressure holding mechanism of the high-pressure fuel pump according to the fourth embodiment.

As shown in FIGS. 8 and 9, the plug 341 is in an approximately cylindrical shape and formed of a metallic material. The plug 341 has a center portion defining a constriction 342. The plug 341 has an end at the side of the discharge passage 83, and the end is integrally formed with a core 343 as a core member. A male screw part 346 is formed at the opening side of the accommodation hole 88. The male screw part 346 is engaged in a female screw 89*a* formed on the inner circumferential wall of the opening end of the accommodation hole 88. The return passage 85 at the side of the compression chamber 18 communicates with a space defined by the constriction 342 when the plug 341 is accommodated in the accommodation hole 88.

The core 343 and the constriction 342 of the plug 341 therebetween have a large diameter portion 347. A groove 348 is formed in the tip portion of the core 343. The clasp 354 is fixed to the groove 348 for restricting the washer 353 from falling off the core 343.

As shown in FIG. 9, a circular groove 345 is formed in an outer circumferential wall 344 of the core 343. The cylindrical member 349 is provided to the radially outer side of the core 343. The cylindrical member 349 is formed of a resin material or the like excellent in elasticity compared with the core 343. In the present embodiment, the cylindrical member 349 is formed of, for example, Teflon (registered trademark). Teflon (registered trademark) is a material having high fuel resistance and being small in dimension change due to swelling caused by fuel. As a resin material for forming the cylindrical member 349, a material other than Teflon (registered trademark) may be used as long as the material has excellent elasticity compared with the core 343 and is small in dimension change due to swelling caused by fuel.

As shown in FIG. 9, a rubber O-ring 352 is provided on the outer side of an outer circumferential wall 350 of the cylindrical member 349. The O-ring 352 is in close contact with the outer circumferential wall 350 of the cylindrical member 349 at a radially inner side. The O-ring 352 is in close contact with the inner circumferential wall 89 of the accommodation hole 88 at a radially outer side. In the present structure, the space between the outer circumferential wall 350 of the cylindrical member 349 and the inner circumferential wall 89 of the accommodation hole 88 is sealed by the O-ring 352. In the present embodiment, the core 343 is equivalent to a core member, and the cylindrical member 349 with the O-ring 352 is equivalent to an elastic member.

The washer 353 is provided to the tip portion of the core 343. The washer 353 is provided closely to the cylindrical member 349 and the O-ring 352 as shown in FIG. 9, thereby restricting the end of the O-ring 352 at the side of the discharge passage 83 from protruding over the axial end of the cylindrical member 349. The large diameter portion 347 of the plug 341 is provided closely to the cylindrical member 349 and the O-ring 352, thereby restricting the end of the O-ring 352 at the opening end side of the accommodation hole 88 from protruding over the axial end of the cylindrical member 349. At the side of the discharge passage 83 of the washer 353, the clasp 354 in an approximately C-shape is provided for restricting the washer 353 from falling off.

Next, assembling of the pressure holding mechanism 340 and force exerted between components of the pressure holding mechanism 340 are described.

Figure 10:
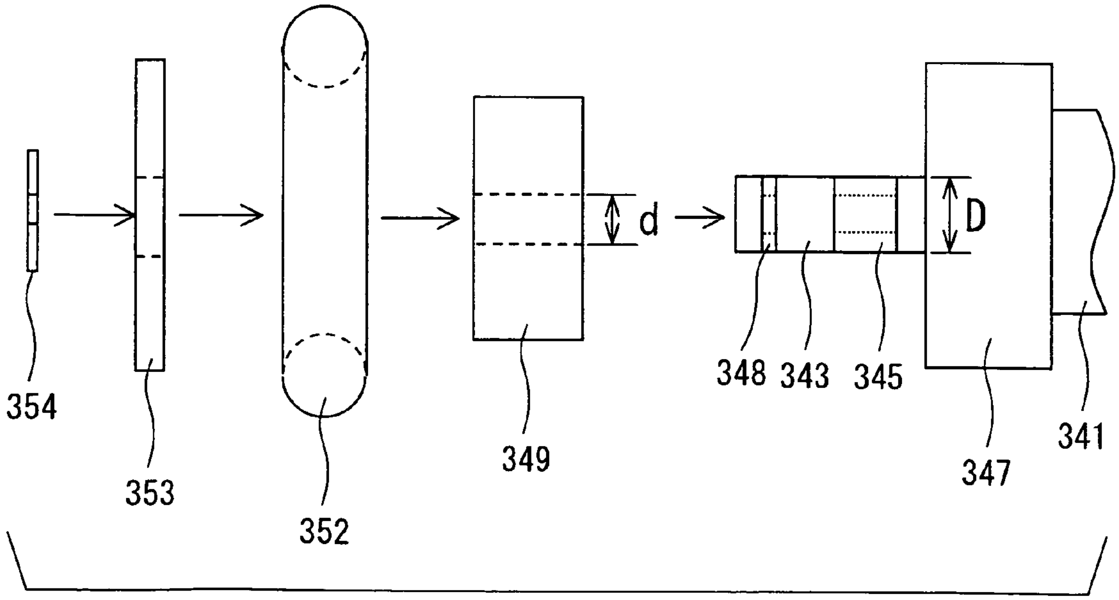
FIG. 10 is an exploded diagram showing the pressure holding mechanism shown in FIG. 9.

As shown in FIG. 10, the pressure holding mechanism 340 is formed by sequentially assembling the cylindrical member 349, the O-ring 352, the washer 353, and the clasp 354 from the tip end side of the core 343 of the plug 341.

As shown in FIG. 10, in a condition before the cylindrical member 349 is inserted into the core 343, the inner diameter d is set to be smaller than the outer diameter D, wherein the inner diameter of an inner circumferential wall 351 of the cylindrical member 349 is defined as d, and the outer diameter of the core 343 is defined as D. Therefore, when the core 343 is inserted into the inner circumferential wall 351 of the cylindrical member 349, the inner circumferential wall 351 of the cylindrical member 349 is expanded radially outward by being urged from the outer circumferential wall 344 of the core 343. As a result, surface pressure is produced between the inner circumferential wall 351 of the cylindrical member 349 and the outer circumferential wall 344 of the core 343 depending on difference between the outer diameter D and the inner diameter d. Hereinafter, the difference between the outer diameter D and the inner diameter d is defined as an interference.

As shown in FIG. 10, the O-ring 352 has a circular section before being inserted into the accommodation hole 88. When the O-ring 352 is mounted on the cylindrical member 349 and then inserted into the accommodation hole 88, the O-ring 352 is pinched between the inner circumferential wall 351 of the cylindrical member 349 and the inner circumferential wall 89 of the accommodation hole 88, so that the cross section of the O-ring deforms. In the present structure, the O-ring 352 exerts repelling force, so that the surface of the O-ring 352 closely makes contact with the outer circumferential wall 350 of the cylindrical member 349 and the inner circumferential wall 89 of the accommodation hole 88. Consequently, sealing between the cylindrical member 349 and the accommodation hole 88 is secured. Moreover, the repelling force fastens the cylindrical member 349, and the repelling force is further exerted to the region between the cylindrical member 349 and the core 343, thereby to further increase the surface pressure between the cylindrical member 349 and the core 343. Hereinafter, such force of fastening the cylindrical member 349 by the O-ring 352 is defined as straining force.

Here, since the center portion in the axial direction of the cylindrical member 349 is closely in contact with the O-ring 352 provided at the radially outer side, maximum straining force by the O-ring 352 is exerted to the center portion. Therefore, surface pressure becomes maximum at the center portion.

As shown in FIG. 9, the circular groove 345 is provided in the outer circumferential wall 344 of the core 343 at a position, which is opposed to the center portion of the inner circumferential wall 351 of the cylindrical member 349 in the axial direction. The groove 345 is formed at a position where the surface pressure is maximum. The groove 345 has a predetermined width in the axial direction.

The groove 345 is formed, thereby a space is formed between the cylindrical member 349 and the core 343, so that influence of the interference or the straining force decreases. Consequently, the surface pressure decreases in the center portion. The surface pressure is smaller than that of surface pressure produced by closely in contact with the O-ring 352 to the outer circumferential wall 350 of the cylindrical member 349 and to the inner circumferential wall 89 of the accommodation hole 88.

As follows, an operation of the pressure holding mechanism 340 is described.

According to the present structure, since fuel pressure in the compression chamber 18 decreases immediately after the high-pressure fuel pump 3 stops, large differential pressure is produced between the passage closer to the delivery pipe 4 and the passage closer to the compression chamber 18 with respect to the pressure holding mechanism 340. In this condition, the discharge valve 20 is maintained to close the discharge passage 83.

As described above, the surface pressure caused between the cylindrical member 349 and the core 343 is smaller than the surface pressure exerted between the cylindrical member 349 and the accommodation hole 88 from the O-ring 352 in the pressure holding mechanism 340. Therefore, high-pressure fuel in the delivery pipe 4 flows into the accommodation hole 88 through the return passage 85 at the side of the discharge passage 83, and furthermore enters into the gap between the cylindrical member 349 and the core 343, the gap being exerted with the lower surface pressure.

In the condition where the differential pressure is large, fuel pressure in the delivery pipe 4 is high. Since the cylindrical member 349 is formed of a material excellent in elasticity compared with the core 343, fuel pressure of the high-pressure fuel overcomes the surface pressure exerted between the cylindrical member 349 and the core 343, and consequently the cylindrical member 349 elastically deforms. Thus, the gap is enlarged by the fuel pressure, and consequently the high-pressure fuel in the delivery pipe 4 flows to the compression chamber 18 through the gap.

In the present structure, even in the condition where the high-pressure fuel pump 3 stops and thereafter the discharge valve 20 closes the discharge passage 83, the high-pressure fuel in the delivery pipe 4 can be released into the compression chamber 18 corresponding to a low pressure side through the pressure holding mechanism 340.

Moreover, since the cylindrical member 349 is formed of a material excellent in elasticity compared with the core 343 as described hereinbefore, when the differential pressure decreases to a predetermined pressure or less and thereby the surface pressure exerted therebetween overcomes the fuel pressure in the delivery pipe 4, the gap is automatically closed. The gap is closed, thereby fuel is restricted from intruding to the compression chamber 18, and consequently the fuel flow stops. Thus, fuel pressure at the side of the delivery pipe 4 is maintained at the feed pressure or more. According to the present configuration, when the high-pressure fuel pump 3 is restarted, the fuel pressure in the delivery pipe 4 can be increased to a fuel pressure suited to a normal operation in a short time.

In the present embodiment, each of the core 343, the cylindrical member 349, and the O-ring 352, which are included in the pressure holding mechanism 340, has a circular section. Therefore, the components are easily manufactured and procured, and consequently increase in manufacturing cost can be suppressed.

As described hereinbefore, in the present embodiment, the pressure holding mechanism 340 can control flow and stop of fuel only by the core 343, the cylindrical member 349, and the O-ring 352, which form the gap communicating between the delivery pipe 4 and the compression chamber 18. That is, the embodiment need not separately have the spring 51 or 151 for biasing the valve needle 47, 147 or 147*a* in the valve closing direction, which are needed in the first and second embodiments. According to the present embodiment, since such components need not be separately provided, a simpler structure of the pressure holding mechanism 340 can be made.

According to the structure of the pressure holding mechanism 340 in the present embodiment, opening and closing of the gap, which communicates the delivery pipe 4 with the compression chamber 18, can be controlled by pressure of entering fuel. Therefore, the size of the gap can be made small compared with the gap formed by closely providing rigid bodies to each other as in the first to third embodiments. According to the present structure, leakage of fuel flowing to the compression chamber 18 through the gap can be decreased. Consequently, when the high-pressure fuel pump 3 is being operated, reduction in volume efficiency of the high-pressure fuel pump 3 can be suppressed, such reduction being caused by fuel returning into the compression chamber 18 through the return passage 85.

In the present embodiment, the elastic member is configured by the cylindrical member 349 and the O-ring 352, and the high-pressure fuel is lead from the delivery pipe 4 into the compression chamber 18 only through the gap between the core 343 and the cylindrical member 349. Thus, the circumferential length of the gap, through which high-pressure fuel flows, can be decreased. Moreover, leakage of fuel flowing from the delivery pipe 4 to the compression chamber 18 can be restricted, thereby high-pressure fuel can be restricted from flowing from the delivery pipe 4 to the compression chamber 18 by an unintentionally large amount.

Types of vehicles or specifications of the internal combustion engine 7, on which a fuel system including the high-pressure fuel pump 3 is mounted, are variously different. Therefore, the length (volume) of a fuel piping of the fuel system, heat received by the fuel piping from the internal combustion engine 7, and a heat radiation condition of the fuel piping are also changed depending on types of vehicles or specifications of the internal combustion engine 7.

Therefore, leakage of fuel required for the pressure holding mechanism 340 is different depending on the types of vehicles or the specifications of the internal combustion engine 7, on which the fuel system including the high-pressure fuel pump 3 is mounted. Moreover, the fuel pressure (holding pressure) to be maintained after fuel pressure decreases is also different depending on the types of vehicles or the specifications of the internal combustion engine 7.

In the present embodiment, the leakage of fuel or the holding pressure, which is different depending on the types of vehicles or the specifications of the internal combustion engine 7, can be easily adjusted. Specifically, the surface pressure produced between the inner circumferential wall 351 of the cylindrical member 349 and the outer circumferential wall 344 of the core 343 is adjusted, thereby the leakage of fuel or the holding pressure can be easily adjusted.

In the structure of the pressure holding mechanism 340 according to the present embodiment, when fuel pressure in the delivery pipe 4 overcomes the surface pressure exerted between the cylindrical member 349 and the core 343, the gap is formed therebetween so that fuel flows into the compression chamber 18. When the surface pressure is small compared with the fuel pressure in the delivery pipe 4, the size of the gap to be formed increases, so that flow resistance of fuel flowing through the gap decreases, and consequently leakage of fuel flowing into the compression chamber 18 increases. Conversely, when the surface pressure is large, the size of the gap to be formed decreases, so that flow resistance of fuel flowing through the gap increases, and consequently leakage of fuel decreases.

When the fuel pressure in the delivery pipe 4 is lower than the surface pressure, the gap that has been formed is automatically closed. When the gap is closed, fuel is restricted from intruding to the compression chamber 18, and consequently the fuel flow stops. When the surface pressure is increased, even in the condition where the differential pressure between the delivery pipe 4 and the compression chamber 18 is large, the fuel flow to the compression chamber 18 can be stopped, therefore the holding pressure can be increased. Conversely, when the surface pressure is decreased, the holding pressure can be decreased. According to the present structure, the leakage of fuel and the holding pressure can be adjusted only by adjusting the surface pressure of each of the members forming the gap, without using other members. The members forming the gap are the cylindrical member 349 and the core 343 in the present embodiment.

Generally, when fluid flows through a small gap, when the passage area and a viscosity coefficient of the fluid are constant, the flow rate of the fluid flowing through the gap decreases with increase in channel length. The reduction in flow rate is caused because when the channel length is long, flow resistance of fluid flowing through the channel increases, and hence flow of the fluid is restricted.

In the present embodiment, the present phenomena is used, thereby the leakage of fuel and the holding pressure are controlled by adjusting the axial length of the cylindrical member 349. Specifically, the length of the cylindrical member 349 is increased, thereby the leakage of fuel is decreased, and the holding pressure is increased. According to the present structure, the leakage of fuel and the holding pressure can be adjusted by a simple way of adjusting the axial length of the cylindrical member 349.

Hereinafter, a method of adjusting the surface pressure exerted between the cylindrical member 349 and the core 343 is specifically described.

In the present embodiment, the surface pressure exerted therebetween is controlled by adjusting an interference determined by the outer diameter D of the core 343 and the inner diameter d of the inner circumferential wall 351 of the cylindrical member 349, the straining force of the O-ring 352, and the size of the groove 345 formed in the outer circumferential wall 344 of the core 343.

The surface pressure can be increased by increasing the interference. The surface pressure can be increased by increasing the straining force of the O-ring 352. The straining force can be increased by increasing the outer diameter of the O-ring 352 or decreasing the inner diameter of the O-ring 352.

The outer diameter and the inner diameter of the O-ring 352 are determined such that each end in the axial direction of the O-ring 352 does not protrude over each end in the axial direction of the cylindrical member 349 even when the O-ring is inserted into the accommodation hole 88 and adequately immerged in fuel. In the present structure, each end in the axial direction of the O-ring 352 can be restricted from protruding over each end in the axial direction of the cylindrical member 349. Consequently, the straining force of the O-ring 352 can be adequately applied to the cylindrical member.

Furthermore, in the present embodiment, as shown in FIG. 9, the washer 353 and the large diameter portion 347 of the plug 341 are provided so as to be close to each end in the axial direction of each of the cylindrical member 349 and the O-ring 352. In the present structure, each end in the axial direction of the O-ring 352 can be restricted from protruding over each end in the axial direction of the cylindrical member 349. Consequently, the straining force of the O-ring 352 can be adequately applied to the cylindrical member 349. The washer 353 with the large diameter portion 347 of the plug 341 is equivalent to a stopper portion.

The surface pressure can be decreased by increasing the width in the axial direction of the groove 345. In the present embodiment, since the groove 345 is in a circular shape, only the width in the axial direction is adjusted. However, when the groove 345 is not circular, and has a certain length in the circumferential direction, both widths in the axial and circumferential directions are adjusted, thereby the surface pressure can be adjusted. In this adjustment, each of widths in the axial and circumferential directions is increased, thereby the surface pressure can be decreased.

Hereinafter, multiple modifications of the method of adjusting the surface pressure produced between the cylindrical member 349 and the core 343 are specifically described.

(First Modification)

Figure 11:
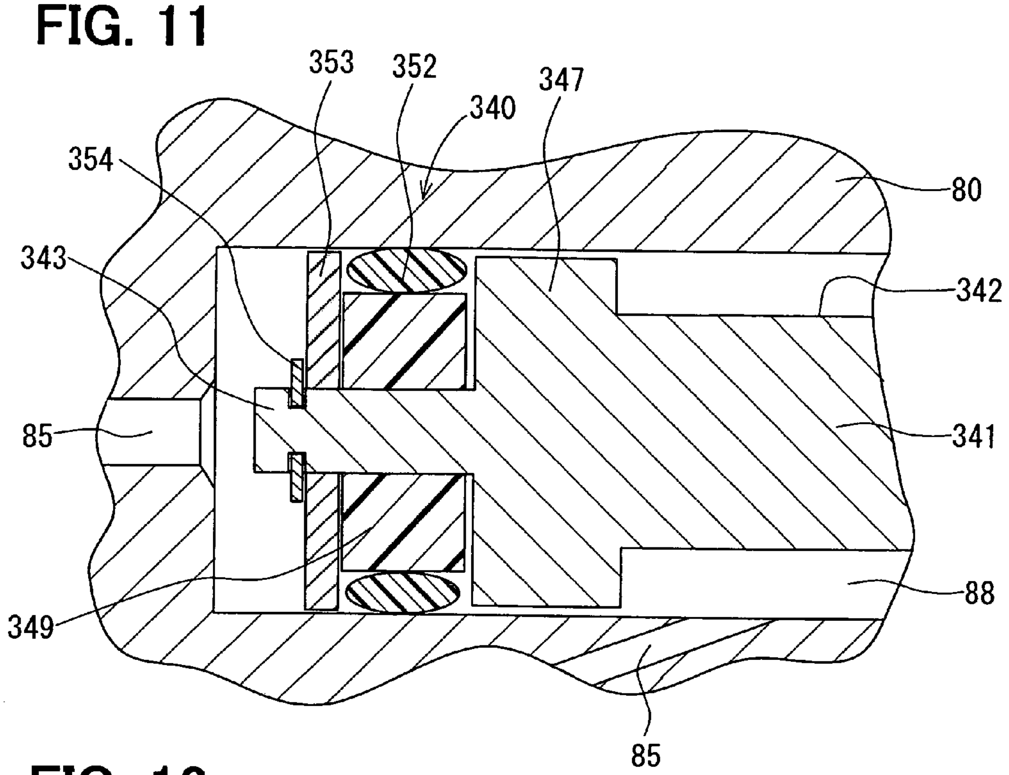
FIG. 11 is a sectional view showing a pressure holding mechanism of the high-pressure fuel pump according to a first modification of the fourth embodiment.

FIG. 11 shows an example where the groove 345, which is formed on the core 343 in the fourth embodiment, is omitted. In this case, the interference between the cylindrical member 349 and the core 343, or the straining force of the O-ring 352 is adjusted, thereby the surface pressure is adjusted as described before.

(Second Modification)

Figure 12:
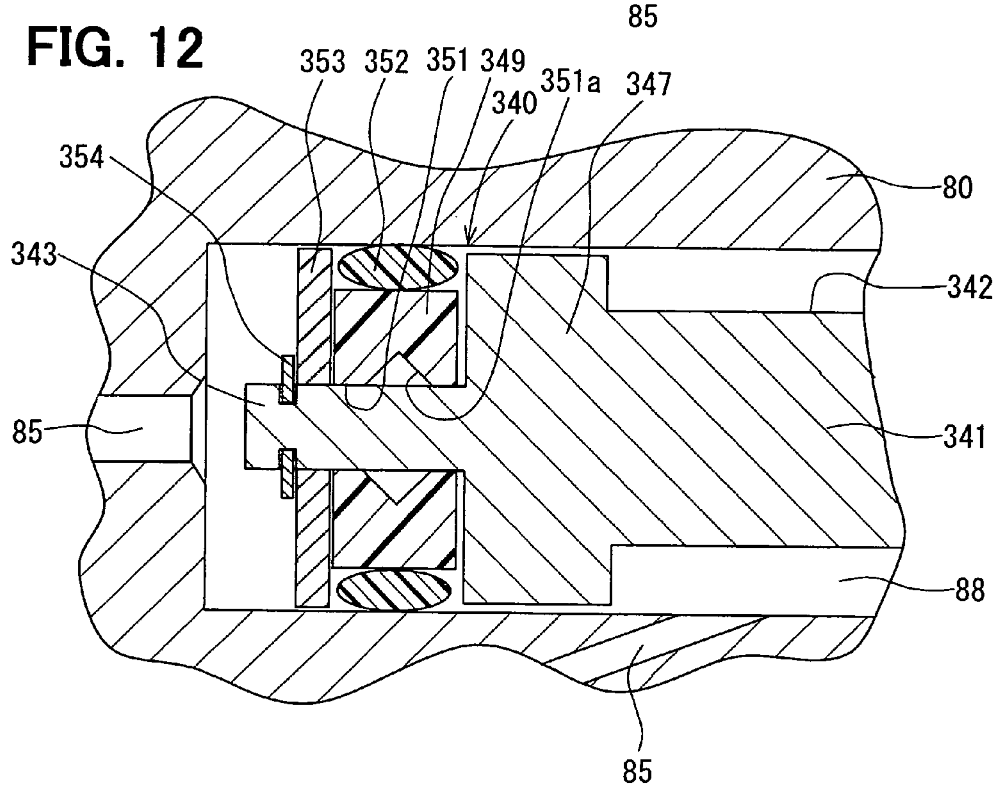
FIG. 12 is a sectional view showing a pressure holding mechanism of the high-pressure fuel pump according to a second modification of the fourth embodiment.

FIG. 12 shows an example where the groove 345, which is formed on the core 343 in the fourth embodiment, is omitted, and a groove 351*a* is formed in the inner circumferential wall 351 of the cylindrical member 349 instead. Even in the case, as in the fourth embodiment, the interference, the straining force of the O-ring 352, or the width in the axial direction or the circumferential direction of the groove 351*a* is adjusted, thereby the surface pressure is adjusted.

(Third Modification)

Figure 13:
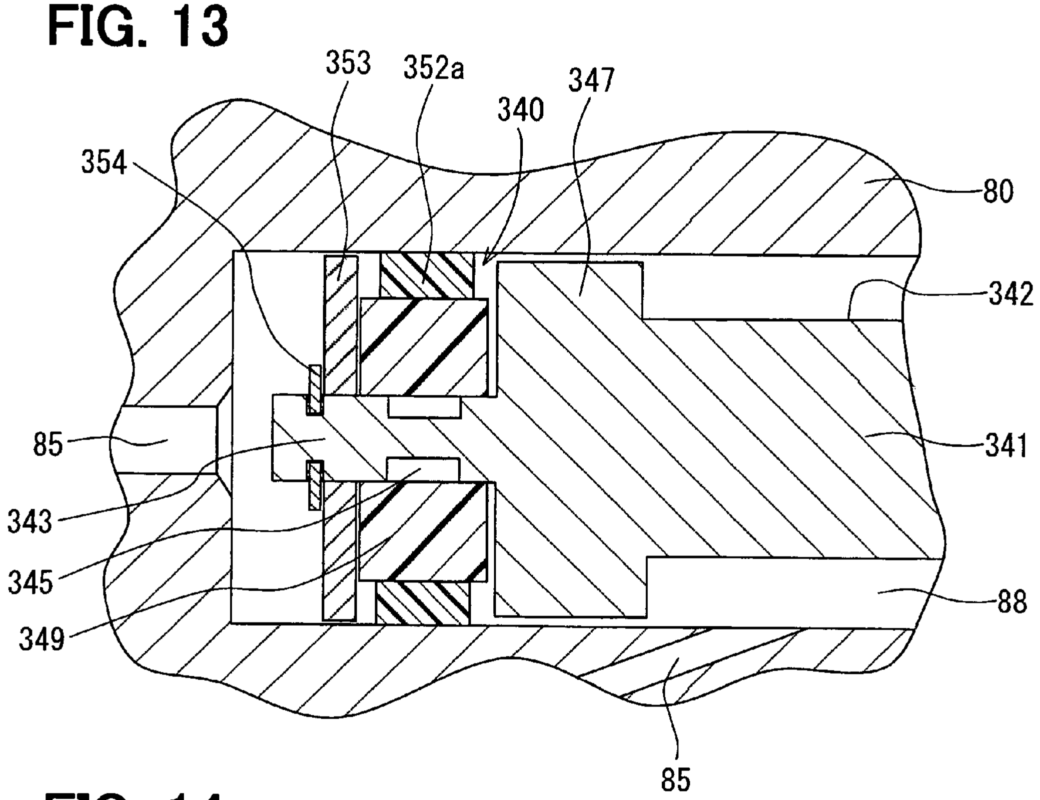
FIG. 13 is a sectional view showing a pressure holding mechanism of the high-pressure fuel pump according to a third modification of the fourth embodiment.

FIG. 13 shows an example where an O-ring 352*a* having a rectangular section is used in place of the O-ring 352 having the circular section in the fourth embodiment. Since the O-ring 352*a* has the rectangular section, distribution of straining force can be made uniform compared with the O-ring having the circular section.

As hereinbefore, according to the methods of the fourth embodiment and the first to third modifications, the leakage of fuel and the holding pressure can be adjusted. Moreover, methods of adjusting the leakage of fuel and the holding pressure are not limited to the methods given in the fourth embodiment and the first to third modifications. For example, the fourth embodiment may be combined with the second, third and the fourth modifications.

(Fifth Embodiment)

Figure 14:
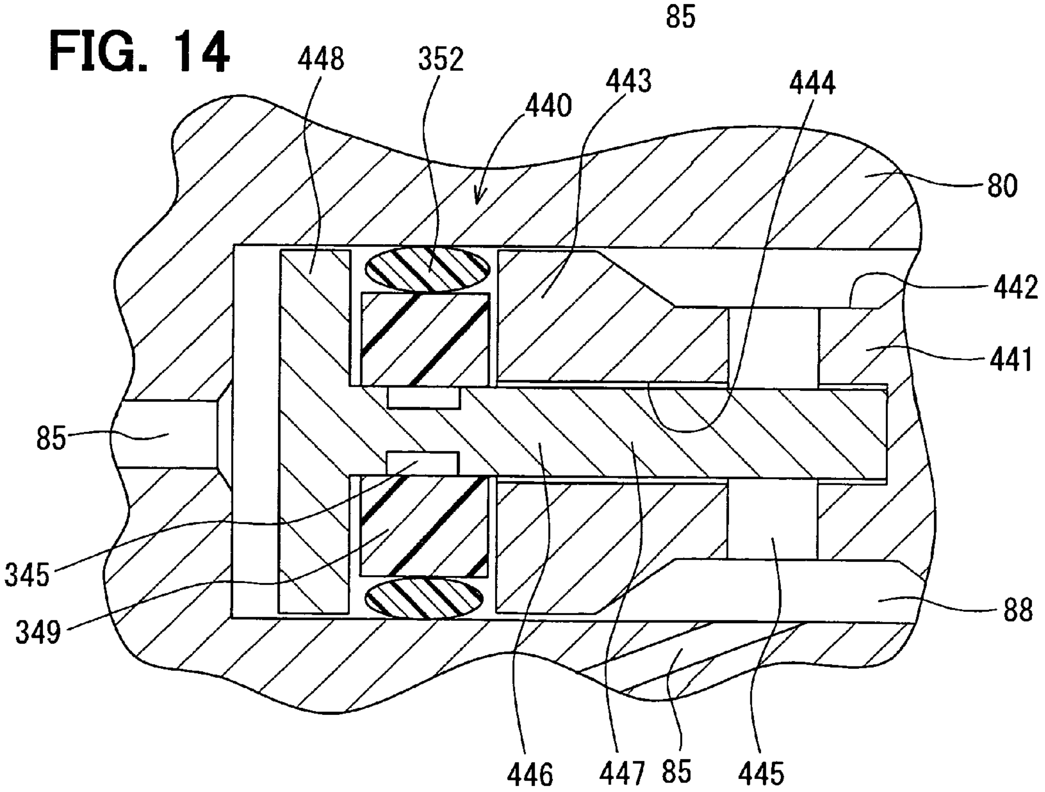
FIG. 14 is a sectional view showing a pressure holding mechanism of the high-pressure fuel pump according to a fifth embodiment.

In the present fifth embodiment shown in FIG. 14, the cylindrical member 349, the core 343 for holding the O-ring 352, and the washer 353 for restricting the protrusion of the O-ring 352 from the axial end of the cylindrical member 349 in the fourth embodiment are integrated into one component. In the present structure, the number of components of a pressure holding mechanism 440 can be decreased compared with that in the fourth embodiment, and the pressure holding mechanism 440 can be easily assembled.

In the present embodiment, a plug 441 is a separate component from a core 446. An insertion hole 444 to be inserted with the core 446 is formed in the axial direction at the end of the plug 441 at the side of the core 446. A through-hole 445 that penetrates the insertion hole 444 in the radial direction is formed in a constriction 442 of the plug 441.

The core 446 has an insertion part 447, which extends in the axial direction to be inserted into the insertion hole 444, and a disk portion 448, which extends from the insertion part 447 in the radial direction to restrict the O-ring 352 from protruding over the axial end of the cylindrical member 349. The cylindrical member 349 and the O-ring 352 are provided between the disk portion 448 and a large diameter portion 443 of the plug 441. The insertion hole 444 and the insertion part 447 are clearance fitted to each other.

Fuel flowing from the delivery pipe 4 into the accommodation hole 88 passes through the gap formed between the cylindrical member 349 and the insertion part 447 of the core 446, and furthermore passes through the gap between the insertion hole 444 and the insertion part 447, and then flows into the through hole 445. The fuel flowing into the through hole 445 returns from the constriction 442 into the compression chamber 18 through the return passage 85 at the side of the compression chamber 18. Even in the present embodiment, leakage of fuel and the holding pressure of the pressure holding mechanism 440 can be adjusted by the same methods as in the fourth embodiment and the first to third modifications thereof.

According to the present structure, since the clasp 354, which has the same function as the disk portion 448 according to the present embodiment and restricts the washer 353 from falling-off, need not be prepared unlike the fourth embodiment. Therefore, the number of components of the pressure holding mechanism 440 can be decreased.

Moreover, according to the present structure, the pressure holding mechanism 440 can be easily assembled only by inserting the core 446, which has the cylindrical member 349 and the O-ring 352 assembled to the insertion part 447, into the insertion hole 444 of the plug 441.

(Sixth Embodiment)

Figure 15:
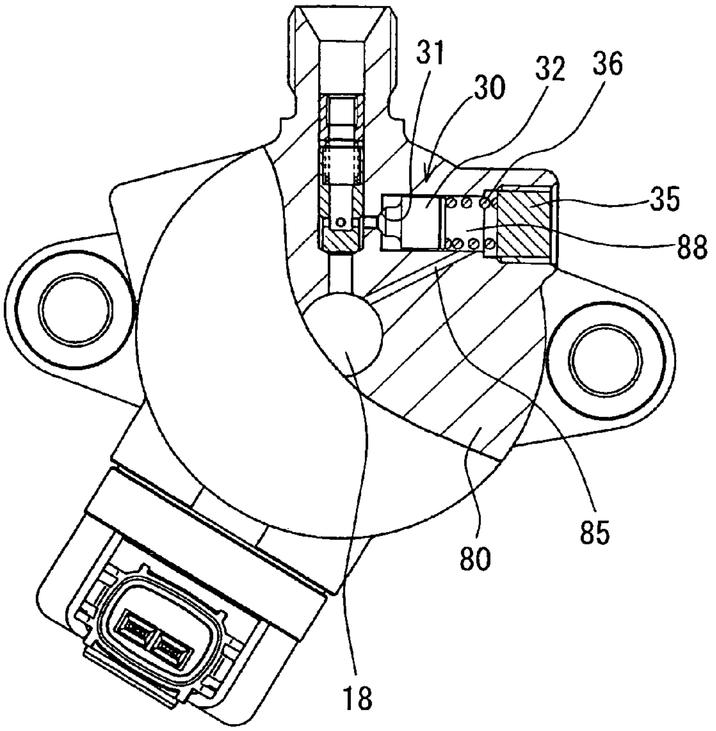
FIG. 15 is a partial sectional view showing a high-pressure fuel pump according to a sixth embodiment.
Figure 16:
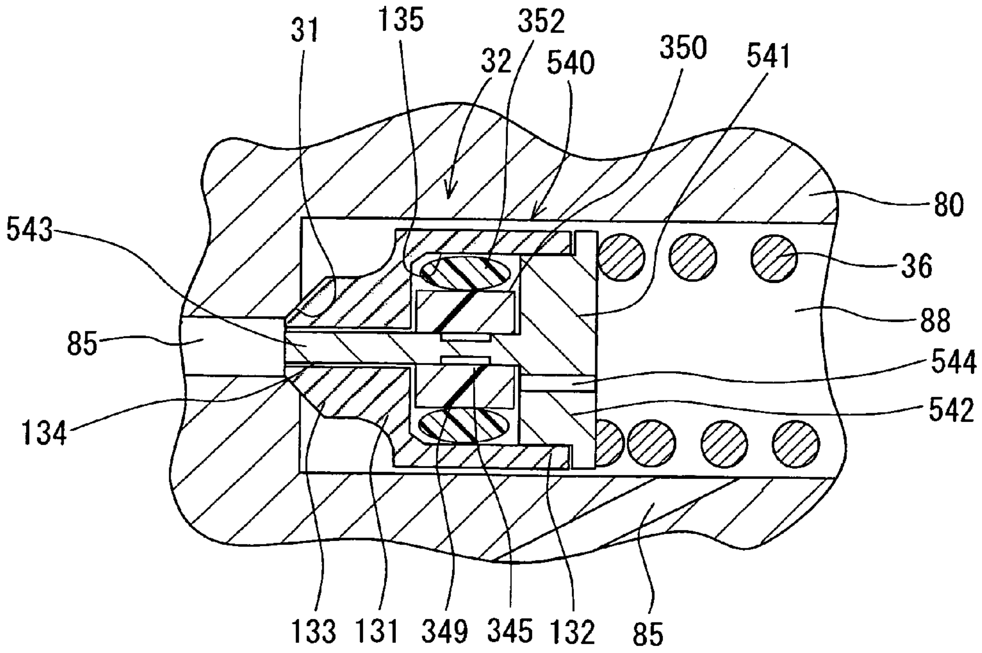
FIG. 16 is a sectional view showing a relief valve and a pressure holding mechanism of the high-pressure fuel pump according to the sixth embodiment.

The sixth embodiment shown in FIGS. 15 and 16 shows an example where a pressure holding mechanism 540 is accommodated by the relief valve 30 by which when fuel pressure in the delivery pipe 4 is in an abnormal high-pressure condition, part of fuel in the delivery pipe 4 is released into the compression chamber 18 to protect the fuel system.

As shown in FIGS. 15 and 16, the relief valve 30 has the valve seat 31, the valve element 32, the stopper 35, the spring 36, and the pressure holding mechanism 540 and is accommodated in the accommodation hole 88 formed midway through the return passage 85. In the present embodiment, the accommodation hole 88 with the return passage 85 is equivalent to a relief passage.

The periphery of the opening of the return passage 85 at the side of the bottom of the accommodation hole 88 defines the valve seat 31.

The valve element 32 is axially slidably supported by the accommodation hole 88. The stopper 35 is in an approximately cylindrical shape and provided at the opening side of the accommodation hole 88 with respect to the valve element 32 so as to close the opening of the accommodation hole 88.

The spring 36 is provided between the stopper 35 and the valve element 32 so as to bias the valve element 32 in the valve closing direction. Biasing force of the spring 36 is determined so as to be capable of maintaining the valve closing until fuel pressure in the delivery pipe 4 exceeds an abnormal pressure.

When fuel pressure in the delivery pipe 4 exceeds the abnormal pressure and thus force exerted on the tip end of the valve element 32 exceeds the biasing force of the spring 36, the valve element 32 moves to the opening side of the accommodation hole 88 and lifted from the valve seat 31. Thus, the discharge passage 83 communicates with the compression chamber 18, and whereby high-pressure fuel in the delivery pipe 4 returns into the compression chamber 18.

Next, a structure of the valve element 32 of the relief valve 30 is described further in detail according to FIG. 16. The valve element 32 includes a valve member 131 and a spring receiving member 541 and has the pressure holding mechanism 540 therein.

The valve member 131 is in an approximately cylindrical shape and has a large diameter portion 132 and a small diameter portion 133. The small diameter portion 133 has the outer diameter different from the outer diameter of the large diameter portion. The valve member 131 has a through hole 134 therein. The inner diameter of the through hole 134 is small at the side of the small diameter portion 133 compared with that at the side of the large diameter portion 132.

The spring receiving member 541 is press-fitted into the opening of the through hole 134 at the side of the large diameter portion 132. The spring receiving member 541 has a seat 542 for receiving one end of the spring 36 and a core 543 for supporting the cylindrical member 349 and the O-ring 352.

The seat 542 is in an approximately disk shape and press-fitted into the opening of the through hole 134 at the side of the large diameter portion 132. In addition, a passage hole 544 extends through both end faces of the seat 542.

The core 543 extends from the end face of the seat 542 at the side of the valve member 131 to the through hole 134. The end of the core 543 reaches the opening of the through hole 134 at the side of the small diameter portion 133. In the small diameter portion 133, the through hole 134 and the core 543 are clearance-fitted to each other.

The cylindrical member 349 and the O-ring 352 are accommodated in the space formed between the seat 542 and the through hole 134. The O-ring 352 seals the space between the outer circumferential wall 350 of the cylindrical member 349 and an inner circumferential wall 135 of the through hole 134.

Fuel flows from the delivery pipe 4 into the accommodation hole 88, then the fuel flows into the space, in which the cylindrical member 349 and the O-ring 352 are accommodated, through the gap formed between the core 543 and the through hole 134 of the valve member 131. The fuel flows from the space to the opening side of the accommodation hole 88 with respect to the valve element 32 through the gap formed between the cylindrical member 349 and the core 543 and the passage hole 544. The flowed-out fuel returns into the compression chamber 18 through the return passage 85 at the side of the compression chamber 18. Even in the present embodiment, leakage of fuel and the holding pressure of the pressure holding mechanism 540 can be adjusted by the same methods as in the fourth embodiment and the first to third modifications thereof.

In the present embodiment, the passage from the through hole 134 formed in the valve member 131 to the passage hole 544 formed in the seat 542 of the spring receiving member 541 is equivalent to a second passage.

(Seventh Embodiment)

Figure 17:
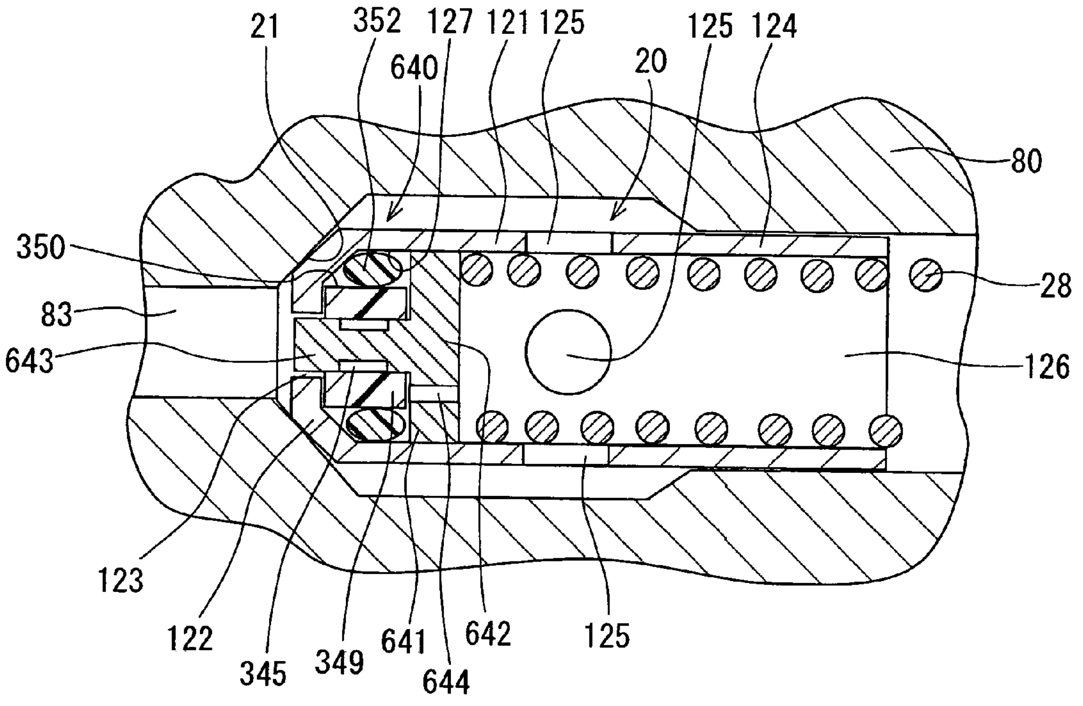
FIG. 17 is a sectional view showing a discharge valve and a pressure holding mechanism of the high-pressure fuel pump according to a seventh embodiment.

The seventh embodiment shown in FIG. 17 is an example where a pressure holding mechanism 640 is accommodated in the discharge valve 20. As shown in FIG. 17, a valve element 121 of the discharge valve 20 is in an approximately cylindrical shape, and the outer wall of the valve element 121 has a bottom 122 that is lifted from and seated on the valve seat 21 of the discharge passage 83. The valve element 121 is axially slidably supported by the discharge passage 83. The pressure holding mechanism 640 is accommodated in the valve element 121.

A fuel passage 126, which communicates with the outlet portion 84, is formed by a sidewall 124 of the valve element 121 on a radially inner side of the valve element 121. Through holes 125, which communicates the passage around the outer wall of the valve element 121 with the fuel passage 126, is formed in the sidewall 124. In the present structure, when the bottom 122 is lifted from the valve seat 21, high-pressure fuel, which has flowed from the compression chamber 18 toward the outer wall of the sidewall 124, flows into the fuel passage 126 through the through holes 125. The high-pressure fuel that flowing into the fuel passage 126 is supplied from the outlet portion 84 into the delivery pipe 4 (refer to FIG. 3).

The spring 28 that biases the valve element 121 in the valve closing direction is provided between the stopper 27 and the valve element 121. When differential pressure caused between the compression chamber 18 and the outlet portion 84 is exerted to the valve element 121 and force exerted on the bottom 122 of the valve element 121 exceeds the biasing force of the spring 28, the valve element 121 is lifted from the valve seat 21. Consequently, the compression chamber 18 communicates with the outlet portion 84.

A spring receiving member 641 is press-fitted into the valve element 121. The spring receiving member 641 is press-fitted into the space at the radially inner side of the sidewall 124 of the valve element 121. The spring receiving member 641 has a seat 642, which receives one end of the spring 28 for biasing the valve element 121 in the valve closing direction, and a core 643 for supporting the cylindrical member 349, and the O-ring 352.

The seat 642 is in an approximately disk shape and press-fitted into the sidewall 124 of the valve element 121. In addition, a passage hole 644 extends through both end faces of the seat 642.

The core 643 extends from the end face of the seat 642 at the side of the bottom 122 to a through hole 123 formed in the bottom 122. The end of the core 643 reaches the through hole 123. The through hole 123 and the core 643 are clearance fitted to each other.

The cylindrical member 349 and the O-ring 352 are accommodated in the space formed between the seat 642 and the bottom 122. The O-ring 352 seals the space between the outer circumferential wall 350 of the cylindrical member 349 and an inner circumferential wall 127 of the side wall 124.

Fuel flows from the delivery pipe 4 into the fuel passage 126, and the fuel flows into the space, in which the cylindrical member 349 and the O-ring 352 are accommodated, through the passage hole 644 of the seat 642. The fuel that has flowed into the space flows from the bottom 122 to the compression chamber 18 through the gap between the cylindrical member 349 and the core 643 and the gap between the core 643 and the through hole 123. The flowed-out fuel returns into the compression chamber 18 through the return passage 83. Even in the present embodiment, leakage of fuel and the holding pressure of the pressure holding mechanism 640 can be adjusted by the same methods as in the fourth embodiment and the first to third modifications thereof.

In the present embodiment, a passage is equivalent to a second passage, the passage extending from the through hole 123 in the bottom 122 of the valve element 121 to the fuel passage 126 in the radially inner side of the valve element 121 through the passage hole 644 in the seat 642 of the spring receiving member 641.

(Eighth and Ninth Embodiments)

Figure 18:
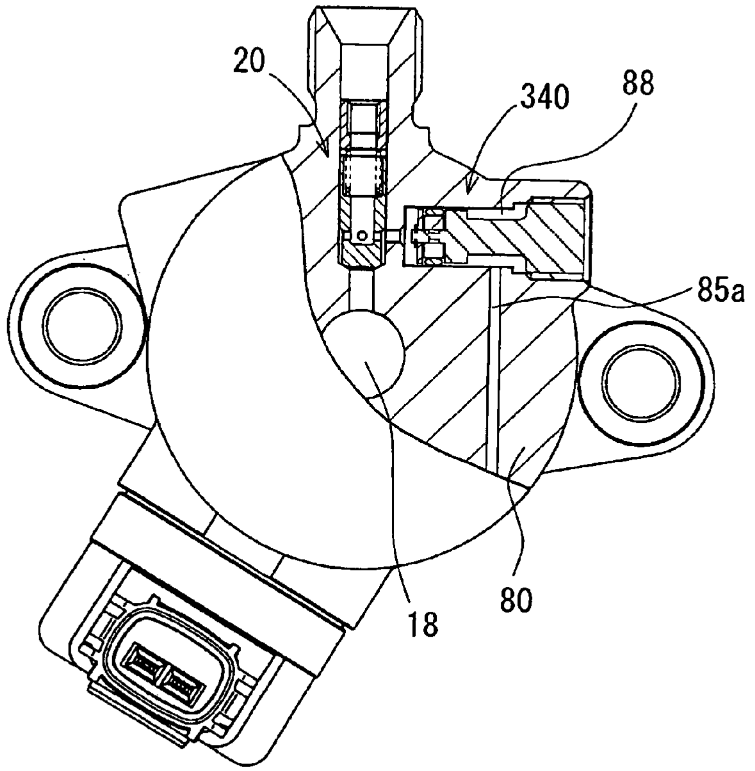
FIG. 18 is a partial sectional view showing a high-pressure fuel pump according to an eighth embodiment.
Figure 19:
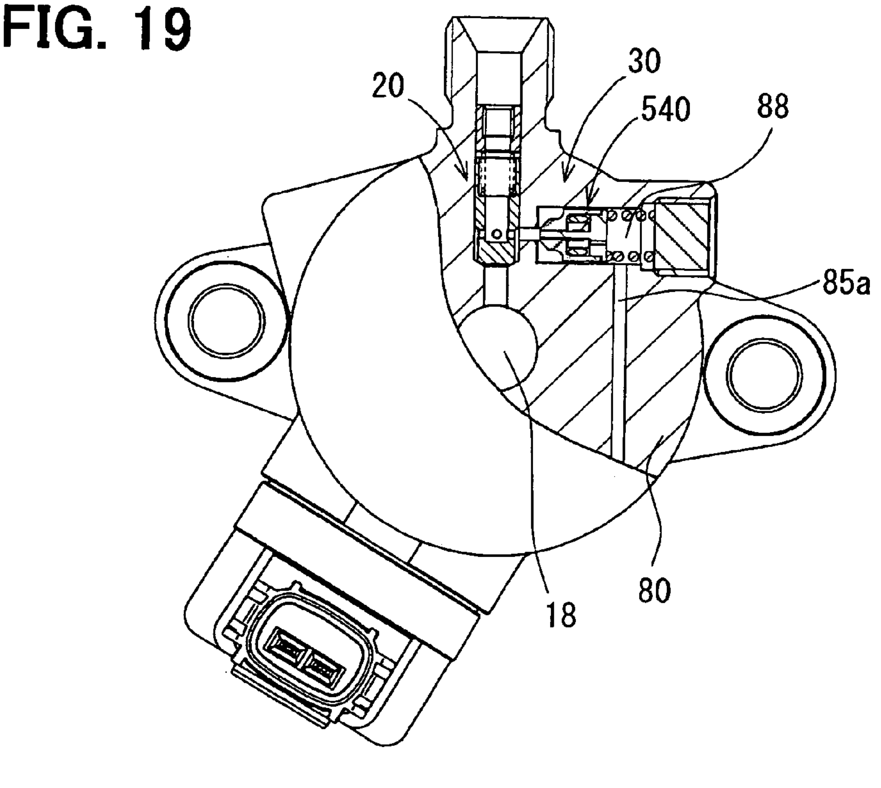
FIG. 19 is a partial sectional view showing a high-pressure fuel pump according to a ninth embodiment.

Eighth and ninth embodiments shown in FIGS. 18 and 19 show an example. In the present example, a low pressure passage 85*a* is provided at the upstream side of the compression chamber 18 in place of the return passage 85 at the side of the compression chamber 18, the return passage 85 connecting the accommodation hole 88 with the compression chamber 18. The low pressure passage 85*a* is provided for connecting the accommodation hole 88 with a low pressure portion such as the suction chamber 91 or the fuel tank 6. When the high-pressure fuel pump 3 is stopped, fuel flows from the pressure holding mechanism 340 or 540, and the fuel returns into the low pressure portion through the low pressure passage 85*a*.

According to the present embodiments, since the low pressure passage 85*a* is connected to the suction chamber 91 or the fuel tank 6 instead of the compression chamber 18, the degree of freedom of setting of the low pressure passage 85*a* can be increased. In the present structures, manufacturing cost can be suppressed.

(Tenth Embodiment)

Figure 20:
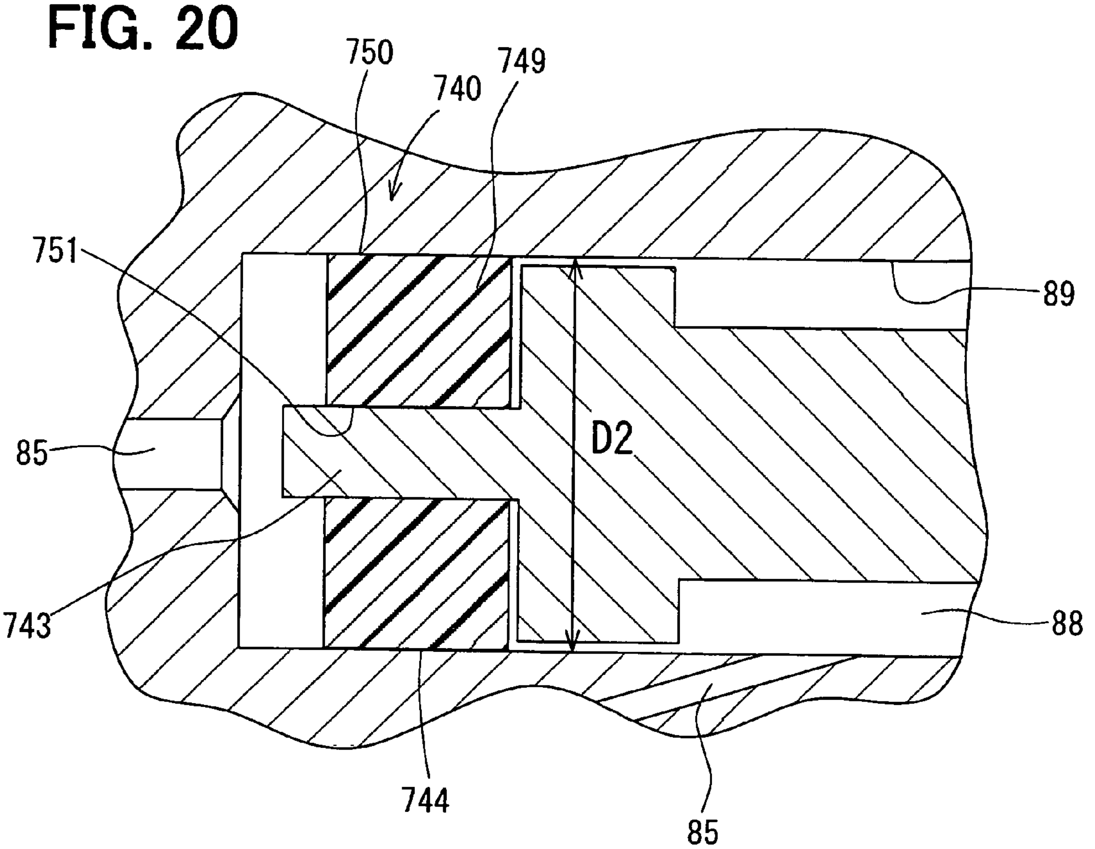
FIG. 20 is a sectional view showing a pressure holding mechanism of a high-pressure fuel pump according to a tenth embodiment.
Figure 21:
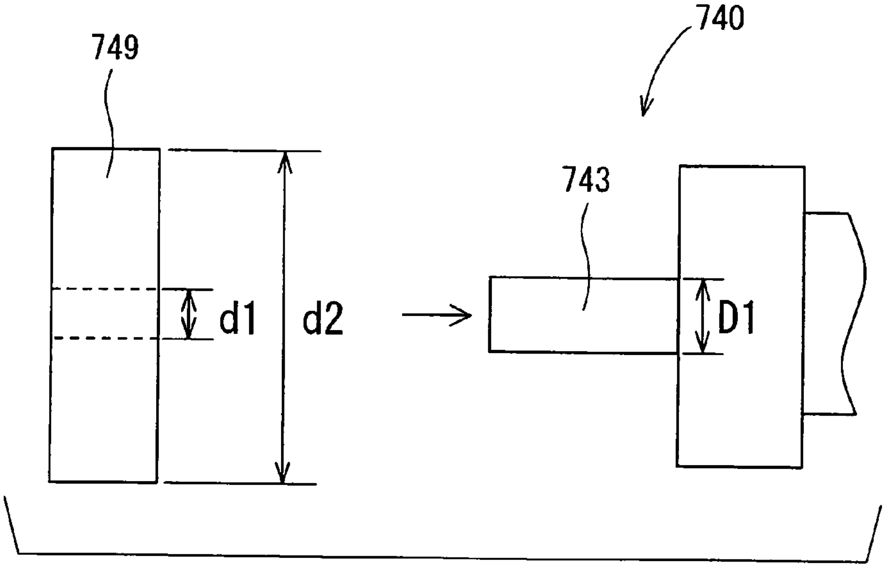
FIG. 21 is an exploded diagram showing the pressure holding mechanism shown in FIG. 20.

The tenth embodiment shown in FIG. 20 shows an example where the elastic member is configured only by a cylindrical member 749. FIG. 21 is an exploded view showing a pressure holding mechanism 740 in the present embodiment.

According to such a structure, the same advantage as in the fourth embodiment can be obtained. Specifically, the cylindrical member 749 supported by an outer circumferential wall 744 of a core 743 is also supported by the inner circumferential wall 89 of the accommodation hole 88. Predetermined surface pressure is produced in both the contact portion between an inner circumferential wall 751 of the cylindrical member 749 and the outer circumferential wall 744 of the core 743 and the contact portion between an outer circumferential wall 750 of the cylindrical member 749 and the inner circumferential wall 89 of the accommodation hole 88.

In the present embodiment, unlike the fourth embodiment, fuel passing through the pressure holding mechanism 740 passes through the space between the inner circumferential wall 751 of the cylindrical member 749 and the passage around the outer circumferential wall 744 of the core 743, and the space between the outer circumferential wall 750 of the cylindrical member 749 and the inner circumferential wall 89 of the accommodation hole 88.

In the present embodiment, as shown in FIGS. 20 and 21, the inner diameter d1 is determined to be smaller than the outer diameter D1, and the outer diameter d2 is determined to be larger than the inner diameter D2 in a condition before the cylindrical member 749 is assembled on the core 743. Here, the inner diameter of the inner circumferential wall 751 of the cylindrical member 749 is defined as d1, the outer diameter of the outer circumferential wall 750 is defined as d2, the outer diameter of the core 743 is defined as D1, and the inner diameter of the inner circumferential wall 89 of the accommodation hole 88 is defined as D2.

In the present structure, predetermined surface pressure can be exerted on each of the portion between the cylindrical member 749 and the core 743 and the portion between the cylindrical member 749 and the accommodation hole 88. Such surface pressure can be controlled by adjusting at least one of the inner circumferential-side interference between the outer diameter D1 and the inner diameter d1 and the outer circumferential-side interference between the outer diameter d2 and the inner diameter D2. In the present structure, the leakage of fuel and the holding pressure can be adjusted. Moreover, the leakage of fuel and the holding pressure can be controlled by adjusting the axial length of the cylindrical member 749.

While the present embodiment is described as a modification of the fourth embodiment, the pressure holding mechanism 740 having the present structure may be applied to each of the sixth to ninth embodiments.

The above structures of the embodiments can be combined as appropriate. In the above embodiments, the operation fluid is fuel as an example. However, the operation fluid may be fluid other than fuel.

Various modifications and alternations may be diversely made to the above embodiments without departing from the spirit of the present invention.

What is claimed is:

1. A high-pressure fuel pump for pressurizing fuel and pumping the fuel to an accumulation chamber, the high-pressure fuel pump comprising:

a housing having a compression chamber, a discharge passage, which is configured to communicate the compression chamber with the accumulation chamber, and a return passage, which is configured to communicate the discharge passage at a side of the compression chamber with the discharge passage at a side of the accumulation chamber;

a plunger axially movable in the housing for pressurizing fuel, which is drawn into the compression chamber;

a discharge valve accommodated in the discharge passage and configured to open to supply fuel from the compression chamber to the accumulation chamber when pressure in the compression chamber becomes higher than or equal to predetermined pressure;

a relief valve having a first valve element accommodated in the return passage, the relief valve configured to close unless pressure in the accumulation chamber becomes higher than a first pressure, which is higher than pressure in a normal operation, the relief valve further configured to open to release pressure in the accumulation chamber to the compression chamber when pressure in the accumulation chamber becomes higher than the first pressure to be in an abnormal high-pressure condition; and a pressure holding mechanism having a fuel passage, which is located in the first valve element and configured to communicate the return passage at a side of the compression chamber with the return passage at a side of the accumulation chamber when the relief valve closes, wherein the pressure holding mechanism further includes a second valve element, which is accommodated in the fuel passage, and the pressure holding mechanism is configured to close to hold pressure in the accumulation chamber when pressure in the accumulation chamber decreases to a second pressure, which is lower than the pressure in the normal operation.

2. The high-pressure fuel pump according to claim 1, wherein the high-pressure fuel pump is configured to pressurize fuel supplied from a low-pressure fuel pump and pump the fuel to an accumulation chamber, and the second pressure is higher than feed pressure of the low-pressure fuel pump.

3. The high-pressure fuel pump according to claim 1, wherein the relief valve includes a first valve seat located in the return passage, wherein the first valve element is configured to be seated on and lifted from the first valve seat, the relief valve further includes a first spring configured to bias the first valve element to seat the first valve element on the first valve seat, the pressure holding mechanism includes a second valve seat located in the fuel passage, wherein the second valve element is configured to be seated on and lifted from the second valve seat, and the relief valve further includes a second spring configured to bias the second valve element to seat the second valve element on the second valve seat.

4. The high-pressure fuel pump according to claim 1, wherein the pressure holding mechanism includes a throttle portion configured to restrict fuel flowing from the return passage at a side of the accumulation chamber to the return passage at a side of the compression chamber.

5. The high-pressure fuel pump according to claim 2, wherein the pressure holding mechanism includes a throttle portion configured to restrict fuel flowing from the return passage at a side of the accumulation chamber to the return passage at a side of the compression chamber.

6. The high-pressure fuel pump according to claim 3, wherein the pressure holding mechanism includes a throttle portion configured to restrict fuel flowing from the return passage at a side of the accumulation chamber to the return passage at a side of the compression chamber.

7. The high-pressure fuel pump according to claim 2, wherein the relief valve includes a first valve seat located in the return passage, wherein the first valve element is configured to be seated on and lifted from the first valve seat, the relief valve further includes a first spring configured to bias the first valve element to seat the first valve element on the first valve seat, the pressure holding mechanism includes a second valve seat located in the fuel passage, wherein the second valve element is configured to be seated on and lifted from the second valve seat, and the relief valve further includes a second spring configured to bias the second valve element to seat the second valve element on the second valve seat.

8. The high-pressure fuel pump according to claim 7, wherein the pressure holding mechanism includes a throttle portion configured to restrict fuel flowing from the return passage at a side of the accumulation chamber to the return passage at a side of the compression chamber.

9. The high-pressure fuel pump according to claim 1, wherein the second valve element is seated on a valve seat in the fuel passage to blockade the accumulation chamber from the compression chamber to hold pressure in the accumulation chamber when pressure in the accumulation chamber decreases to the second pressure.

10. A high-pressure fuel pump for pumping fuel to an accumulation chamber, the high-pressure fuel pump comprising:

a housing having a compression chamber and further having a discharge passage and a return passage each configured to communicate the compression chamber with the accumulation chamber;

a plunger for pressurizing fuel in the compression chamber;

a discharge valve accommodated in the discharge passage and configured to open to supply fuel from the compression chamber to the accumulation chamber when pressure in the compression chamber becomes higher than or equal to predetermined pressure;

a relief valve having a first valve element accommodated in the return passage and configured to:

close unless pressure in the accumulation chamber becomes higher than a first pressure, which is higher than normal pressure; and open to release pressure in the accumulation chamber to the compression chamber when pressure in the accumulation chamber becomes higher than the first pressure to be abnormally high-pressure; and a second valve element accommodated in a fuel passage defined in the first valve element and configured to be:

lifted from a valve seat in the fuel passage to communicate the accumulation chamber with the compression chamber when pressure in the accumulation chamber is higher than a second pressure, which is lower than the pressure in the normal operation, even when the relief valve closes; and seated on the valve seat to blockade the accumulation chamber from the compression chamber to hold pressure in the accumulation chamber when pressure in the accumulation chamber decreases to the second pressure.

* * * * *